United States Patent
Davis

(10) Patent No.: US 8,152,412 B2
(45) Date of Patent: Apr. 10, 2012

(54) PIPELAYER WITH CAB RISER

(75) Inventor: Daniel E. Davis, San Benito, TX (US)

(73) Assignee: Volvo Construction Equipment AB, Eskilstuna (SE)

( * ) Notice: Subject to any disclaimer, the term of this patent is extended or adjusted under 35 U.S.C. 154(b) by 237 days.

(21) Appl. No.: 12/475,126

(22) Filed: May 29, 2009

(65) Prior Publication Data

US 2009/0297275 A1    Dec. 3, 2009

Related U.S. Application Data

(60) Provisional application No. 61/057,000, filed on May 29, 2008.

(51) Int. Cl.
*F16L 1/028* (2006.01)
*B62D 33/063* (2006.01)

(52) U.S. Cl. ............... 405/174; 405/184.4; 405/154.1; 180/89.13

(58) Field of Classification Search ............... 405/154.1, 405/174, 179, 184, 184.1, 184.4; 180/89.12, 180/89.13, 89.14, 89.15
See application file for complete search history.

(56) References Cited

U.S. PATENT DOCUMENTS

| | | | |
|---|---|---|---|
| 2,681,231 A | 6/1954 | Kondracki | |
| 3,254,900 A | 6/1966 | Allen | |
| 3,398,984 A * | 8/1968 | Ajero | 180/89.13 |
| 3,891,264 A * | 6/1975 | Hunter et al. | 180/89.12 |
| 3,957,165 A * | 5/1976 | Smith | 180/89.13 |
| 4,018,473 A * | 4/1977 | Chalupsky | 296/190.04 |
| 4,132,317 A | 1/1979 | Arendt et al. | |
| 4,436,169 A * | 3/1984 | Jennerjohn et al. | 180/89.14 |
| 5,623,410 A * | 4/1997 | Furihata et al. | 180/89.13 |
| 5,826,734 A | 10/1998 | Baumann et al. | |
| 5,865,264 A | 2/1999 | Glass et al. | |
| 5,960,970 A | 10/1999 | Walker | |
| 5,988,654 A * | 11/1999 | Wix et al. | 180/89.15 |
| 6,276,750 B1 * | 8/2001 | Frisch | 296/190.1 |
| 7,594,562 B2 * | 9/2009 | Heusinger | 180/89.12 |
| 2004/0190995 A1 * | 9/2004 | Matsushita et al. | 405/174 |
| 2007/0221600 A1 | 9/2007 | Davis | |

* cited by examiner

*Primary Examiner* — Frederick L Lagman
(74) *Attorney, Agent, or Firm* — Hunton & Williams

(57) ABSTRACT

A pipelayer having an undercarriage with at least two tracks and a main assembly. Each track has a track frame coupled to the undercarriage and a track shoe supported by and movable around the track frame. The main assembly is supported by and rotatable relative to the undercarriage, and has a main frame, a boom pivotally mounted to the main frame, an operator cab, and a cab riser connecting the operator cab to the main frame. The cab riser is operable to selectively raise and lower the operator cab relative to the main frame. Also provided is a movable cab assembly having an operator cab, an adjustment mechanism to connect the cab to a vehicle frame and move to change the operator's view, and a guide to align the cab. A method for laying pipe using a pipelayer having a movable cab is also provided.

21 Claims, 19 Drawing Sheets

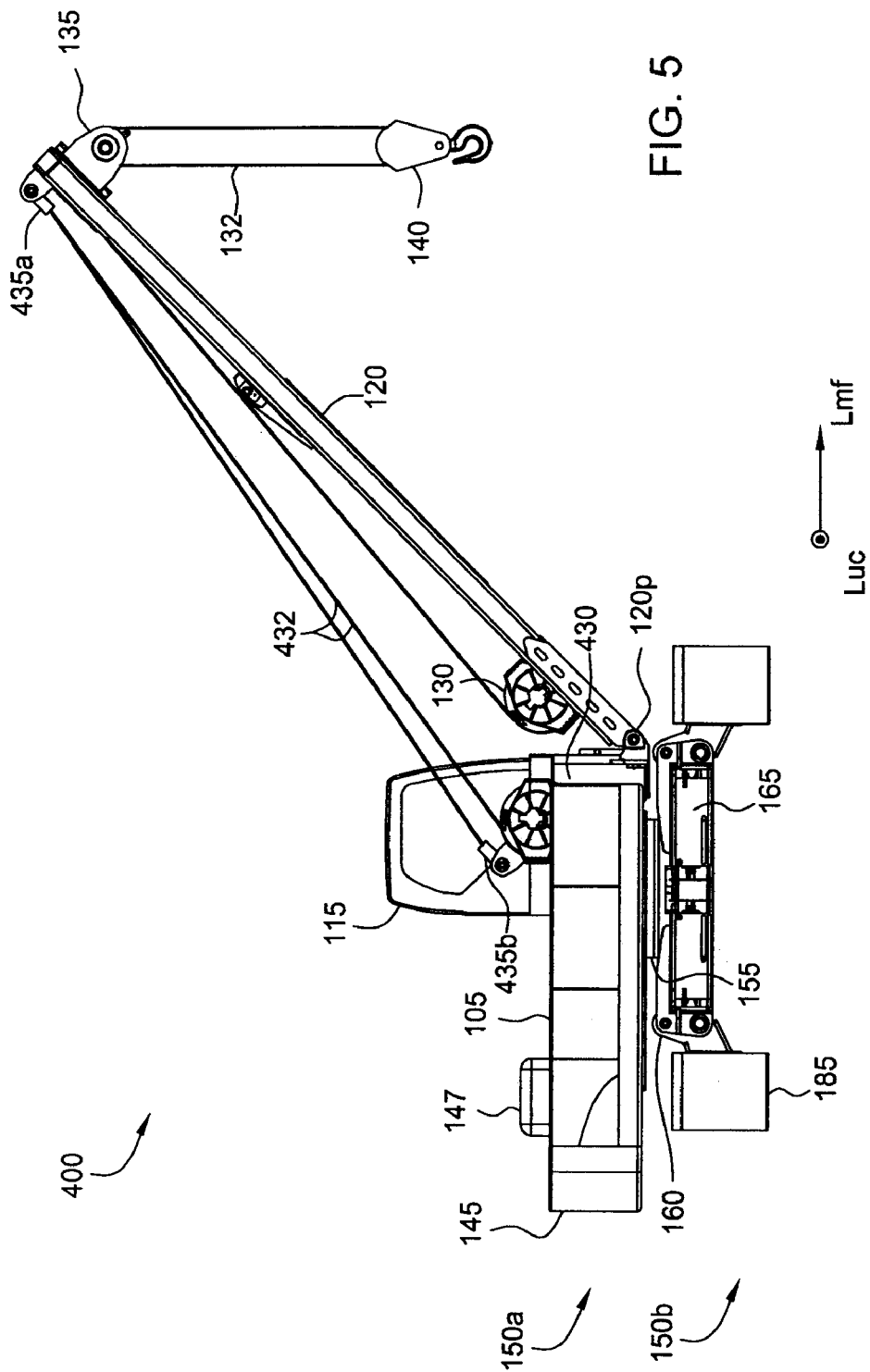

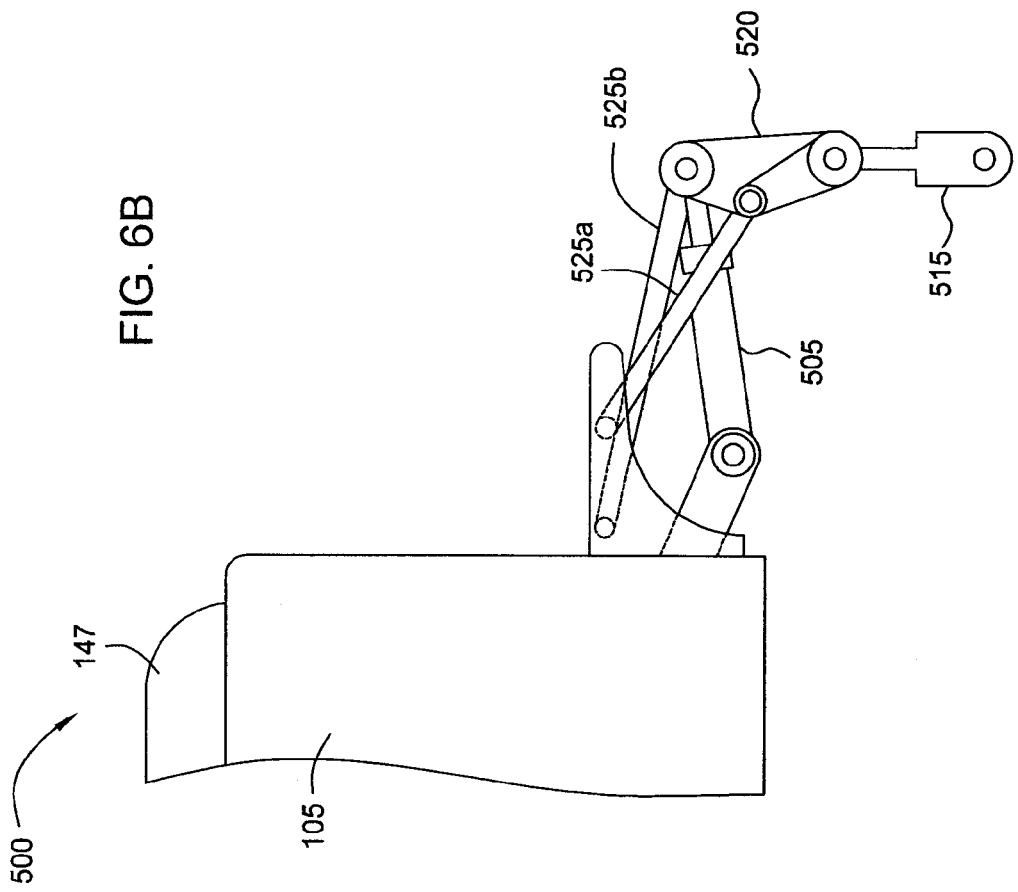
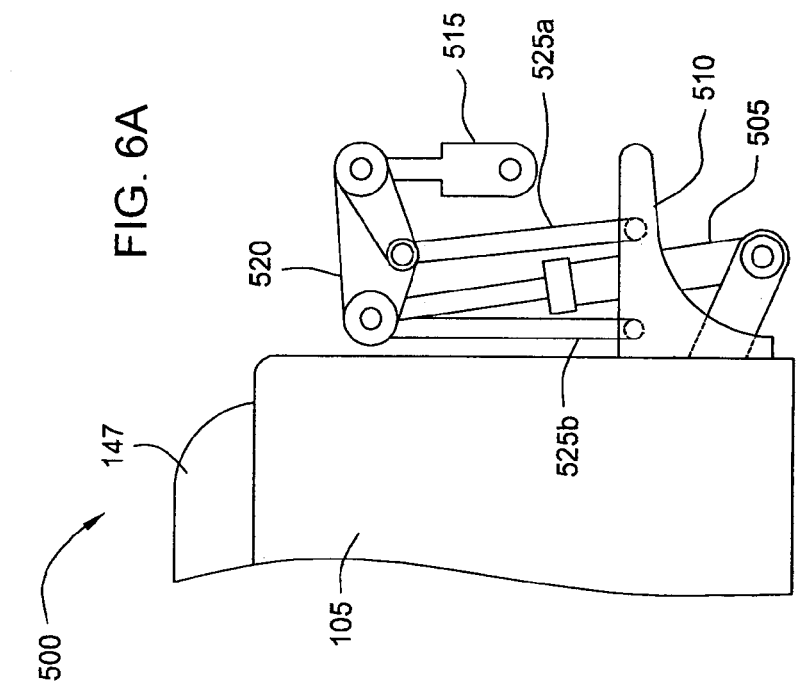

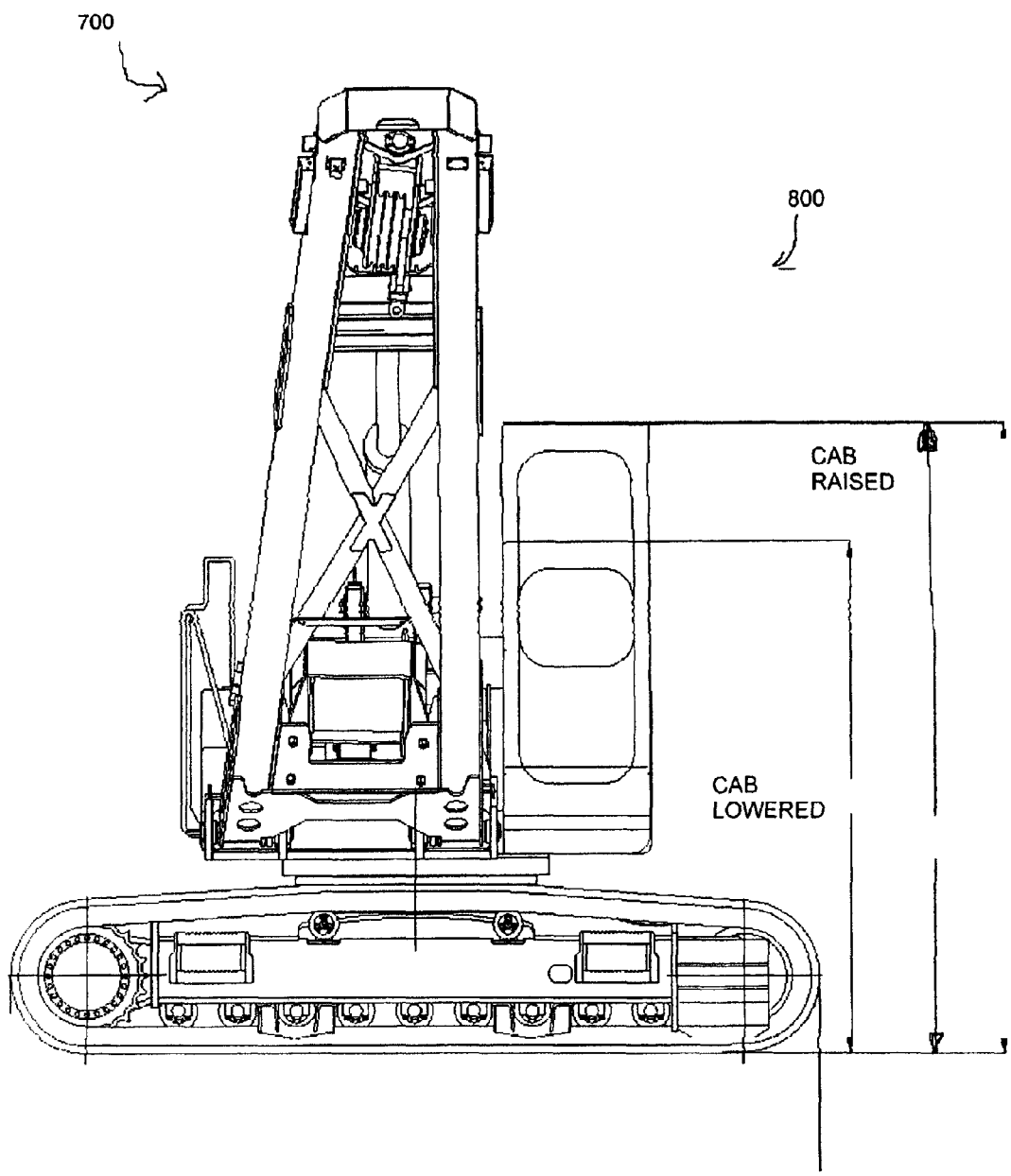

PIPELAYER WITH CAB RISER

CROSS-REFERENCE TO RELATED APPLICATIONS

This application claims the benefit of U.S. Provisional App. No. 61/057,000, filed May 29, 2008, which is hereby incorporated by reference in its entirety.

U.S. patent application Ser. No. 11/746,464 filed May 9, 2007, is hereby incorporated by reference in its entirety.

BACKGROUND OF THE INVENTION

1. Field of the Invention

Embodiments of the present invention generally relate to a pipelayer equipped with a riser cab.

2. Description of the Related Art

FIG. 1 is a front view of a prior art pipelayer 10. The pipelayer 10 is typically used for the construction of underground pipelines which transport hydrocarbons, such as natural gas or gasoline. Typical operation of the pipelayer includes raising, carrying, and lowering heavy pipe 12. The pipelayer 10 is a crawler or tractor-type vehicle having a maneuverable boom 42 disposed on a side thereof. For this reason, the pipelayer 10 is referred to as a sideboom.

The pipelayer 10 further includes a main frame assembly 14 having first and second opposed sides 16 and 18 and a radiator guard 20. The pipelayer 10 includes first and second endless self-laying track assemblies 22, 24, with each of the track assemblies 22, 24 having a roller frame. A rigid cross bar 28 and a pivot shaft connect each track assembly 22, 24 to a respective side 16, 18 of the main frame assembly 14. A pipelayer frame 32 has a first portion 34 secured to the main frame assembly 14 and a second portion 36 secured to one of the roller frames by a plurality of fasteners. The first portion 34 is joined to the second portion 36 by a pin arrangement 40. The boom arm 42 has a first end portion 44, pivotally connected to the pipelayer frame second portion 36, and a second end portion 46 supporting a cable operated load block assembly 48. A drawworks 50 runs a cable 52 in and out to raise and lower the block assembly 48 and the pipe 12. A fluid operated cylinder 54 has a first end portion 56 connected to the pipelayer frame 32 and a second end portion 58 releasably connected to the boom arm second end portion 46. A counterweight 55 is attached to the main frame 14. The counterweight 55 may also be secured to one of the roller frames by a counterweight frame (not shown) similar to the pipelayer frame 32.

The boom arm 42 of the pipelayer 10 cannot rotate without driving the track assemblies 22, 24. To deliver a piece of pipe from the pipe delivery vehicle located on an opposite side of the pipelayer relative to the pipeline trench, the pipelayer would have to drive the track assemblies 22, 24 in order to turn 180 degrees so that the boom would face the pipe delivery vehicle, pick up the pipe, and drive the track assemblies 22, 24 in order to turn 180 degrees so that the boom arm 42 would face the trench in order to deliver the piece of pipe.

Further, the pipelayer 10 is a specialized vehicle. It is not configured to perform other jobs at a pipeline work site, such as excavation. When pipelaying duties are complete, the pipelayer may idle in a yard until required again, which may be a substantial period of time.

SUMMARY OF THE INVENTION

In one aspect, there is provided a pipelayer having an undercarriage having at least two tracks and a main assembly supported by and rotatable relative to the undercarriage. Each track has a track frame coupled to the undercarriage and a track shoe supported by and movable around the track frame. The main assembly has a main frame, a boom pivotally mounted to the main frame, an operator cab, and a cab riser connecting the operator cab to the main frame. The cab riser is operable to selectively raise and lower the operator cab relative to the main frame.

In another aspect, there is provided a movable cab assembly for industrial vehicles. The movable cab riser assembly includes an operator cab, an adjustment mechanism adapted to connect the operator cab to an industrial vehicle frame and selectively move the operator cab relative to the industrial vehicle frame to modify an operator's field of view, and a guide mechanism for insuring proper alignment and travel of the operator cab relative to the industrial vehicle frame.

In another aspect, there is provided a method of laying pipe using a pipelayer equipped with a cab riser for adjusting the height of an operator cab. The method includes lifting a pipe using a boom of the pipelayer, rotating the boom and the pipe relative to a pipelayer undercarriage, adjusting a position of an operator cab relative to the pipelayer undercarriage to provide a different field of view into a trench into which the pipe is to be positioned, and lowering the pipe into the trench using the pipelayer.

The foregoing recitation of the summary of the invention is provided for exemplary purposes, and is not intended to limit the claimed invention in any way.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5 is an orthogonal view of a pipelayer, according to an another embodiment of the present invention.

FIGS. 6A-D illustrate a removable counterweight system (RCW), according to another embodiment of the present invention. FIG. 6A is a side view of the RCW in a first position where a counterweight is engaged with the main frame. FIG. 6B is a side view of the RCW in a second position where the counterweight is disengaged with the main frame and set on the ground. FIG. 6C is a front view of the counterweight. FIG. 6D is a section view of FIG. 18C taken along line 180-180.

FIG. 7A is a view of a pipelayer illustrating operation of a cab riser, according to another embodiment of the present invention. FIGS. 7A-7D are various views of the pipelayer with the cab riser in the raised position.

DETAILED DESCRIPTION

Figure 1:
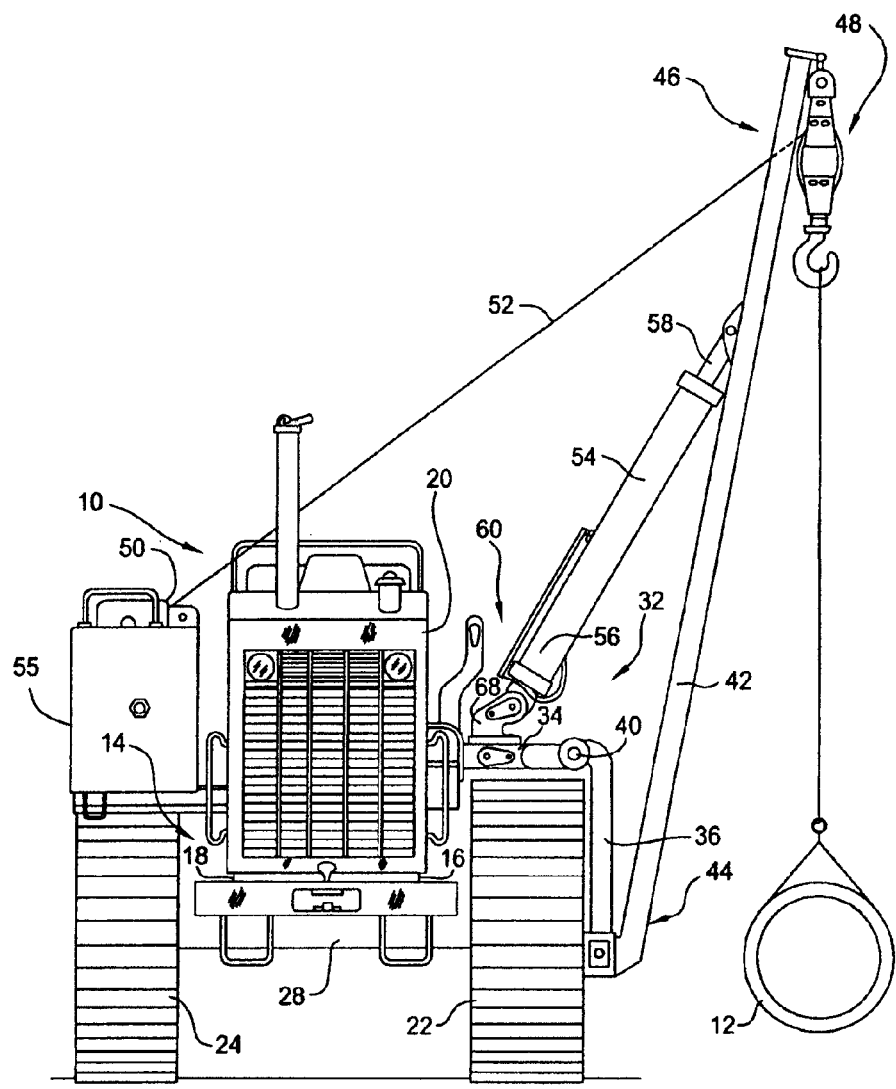
FIG. 1 is a front view of a prior art pipelayer.
Figure 2:
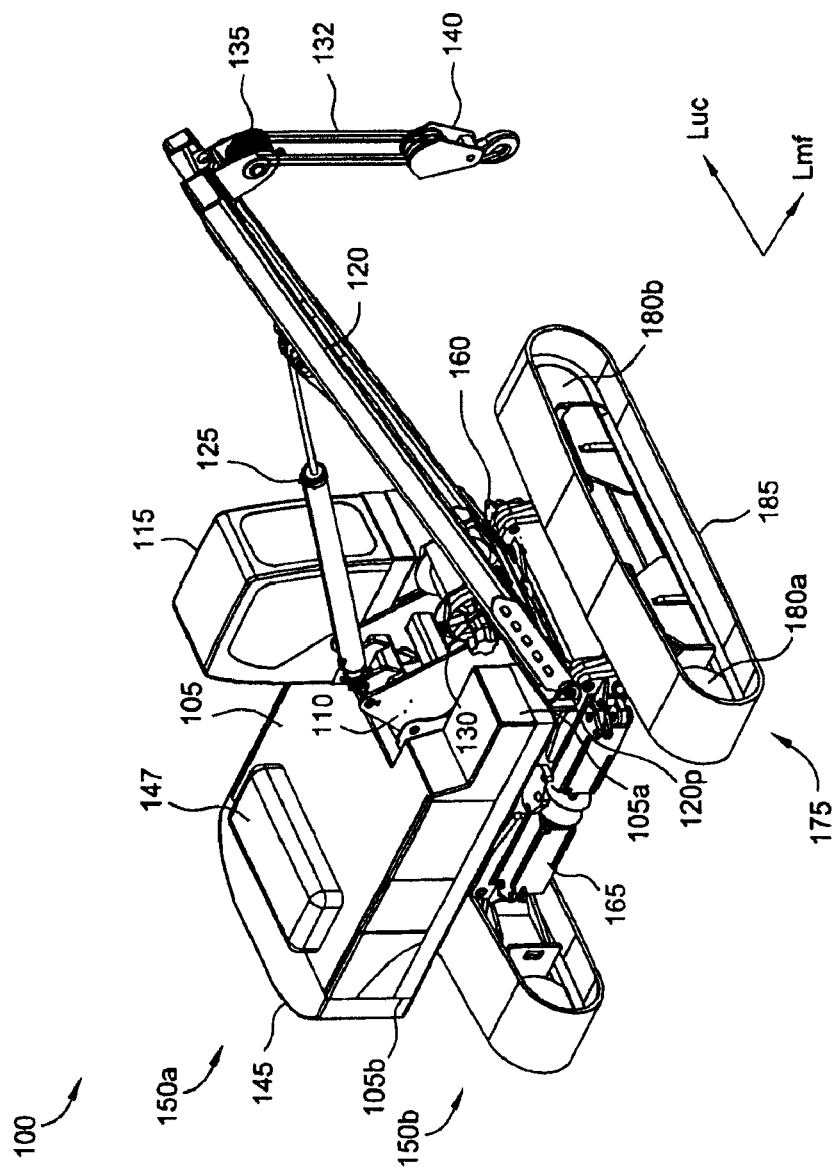
FIG. 2 illustrates a perspective view of a pipelayer, according to one embodiment of the present invention.

FIG. 2 illustrates a perspective view of a pipelayer 100, according to one embodiment of the present invention. The pipelayer 100 includes a main assembly 150a mounted on an undercarriage 150b so that the main assembly 150a may rotate relative to the undercarriage 150b. In the position illustrated, a longitudinal axis $L_{mf}$ of the main assembly 150a is perpendicular to a longitudinal axis Luc of the undercarriage 150b.

The main assembly 150a may include a main frame 105, an adaptor 110, a cab 115, a boom 120, a piston and cylinder assembly 125, a winch 130, a pulley block 135, a load block 140, a counterweight 145, and an engine 147. The main frame 105 has a first side 105a and a second side 105b distal from the first side 105a. Attached to the first side 105a are the adaptor 110 and the operator's cab 115. Pivoted to the adaptor 110 at 120p is a first longitudinal end of the boom 120. As used herein, the term pivoted or pivot includes a single axis pivot, such as a hinge, and a double axis pivot, such as a universal joint. The piston and cylinder assembly (PCA) 125 is also pivoted to the adaptor 110 and to the boom 120 so that extension of the PCA 125 will lower the boom and retraction of the PCA will raise the boom 120. The adaptor 110 may be removably attached to the frame 110 to allow the boom 120 to be replaced with an excavator boom (not shown) or a crane boom (not shown). Alternatively, the boom 120 and PCA 125 may be directly pivoted to the main frame 105 and the adaptor 110 omitted.

Attached near the first longitudinal end of the boom 120 is a winch 130. The winch 130 includes a drum having a cable 132 (only partially shown) wrapped therearound. The drum is rotatable relative to a housing of the winch. The drum may be driven by a hydraulic motor or electric motor (not shown). Pivoted to a second longitudinal end of the boom 120 is a pulley block 135. Hung from the pulley block 135 by the cable 132 is a load block 140. Each of the blocks 135, 140 include a plurality of pulleys or sheaves. The cable 132 extends from the winch drum along the boom 120 and around the sheaves of the pulley block 135 and load block 140 in order to achieve a mechanical advantage. Unwinding of the cable 132 from the drum lowers the load block 140 and winding of the cable 132 around the drum raises the load block 140.

The boom 120 may be an A-frame and may include two primary structural members 120a, b and two cross bars. The boom 120 may also be asymmetric in that one of the primary structural members 120a may extend from the main frame 105 at a first angle relative to a vertical axis that is less than a second angle relative to the vertical axis at which the other one 120b of the primary structural members extends from the main frame. The asymmetric design allows better visibility for the operator and improves loading characteristics of the boom as compared to a symmetric design. The structural members 120a, b may be made from high strength steel square tubing. Alternatively, the boom may be a symmetric A-frame or include only a single structural member.

Attached to the second side 105b is a counterweight 145. Housed in the second side 105b of the main frame is an engine 147. The engine 147 may drive a hydraulic pump (not shown) and a generator or alternator (not shown) for providing hydraulic or electrical energy to components, such as the cab sensors, the PCA 125, and the winch 130. Associated hydraulic and electrical circuitry (not shown) interconnecting these components may also be provided. The engine may be a diesel engine or an alternative fuel engine. Examples of alternative fuel engines include diesel-electric hybrid and hydrogen fuel-cells. The diesel-electric hybrid may use a smaller diesel engine and a bank of batteries (not shown) which would allow operation of the pipelayer 100 without operation of the diesel engine.

Rotation of the main assembly 150a relative to the undercarriage 150b and support for the main assembly 150a by the undercarriage 150b are provided by a rotary drive mechanism (not shown) and a bearing (not shown). The rotary drive mechanism may include a hydraulic or electric motor (not shown) attached to the main frame and rotationally coupled to a pinion (not shown) which meshes with a gear (not shown) rotationally coupled to the undercarriage 150. Operation of the motor will cause the main assembly 150a to rotate relative to the undercarriage 150b. The rotary drive mechanism may further include a slew lock mechanism (not shown) for selectively rotationally coupling the main assembly 150a relative to the undercarriage 150b. The slew lock mechanism may include a gear tooth (not shown) selectively engageable with the gear via operation of a hydraulic cylinder or electric motor (not shown) and a proximity switch to verify engagement of the tooth with the gear. Engagement of the gear with the tooth rotationally couples the main assembly 150a to the undercarriage 150b. Verification of engagement by the proximity switch also prevents operation of the motor. The slew lock is especially useful for operating the pipelayer 100 on a steep grade.

Alternatively, the slew lock mechanism may include a disk (not shown) incorporated in the motor and a retaining mechanism for retaining the disk. The slew lock mechanism is such that when the rotary motor is stopped, the disk is retained by the retaining mechanism to fix a rotor of the motor so as not to rotate, and when the motor is started, the disk is hydraulically or electrically disengaged from the motor, thereby freeing the rotor.

The cab 115 includes walls, a ceiling, and windows to protect the operator from weather conditions and allow visibility for the operator. Placement of the cab 115 on the main frame 105a may allow the operator unobstructed view to the front, left, and/or right. The cab 115 further includes a seat (not shown), operating instruments (not shown), and operating controls (not shown). The cab may further include a load management system (LMS). The LMS is a microprocessor based system and includes a variety of sensors in communication with the microprocessor controller to calculate and display boom angle, boom capacity, and/or the load on load block. The LMS may include a database of boom capacities for various operating positions and surface grades. The LMS may alert the operator, with audio and/or visual warnings, when rated capacity is imminent, reached, and/or exceeded.

The LMS may allow an operator to simulate a multi-position pipelaying operation before performing the operation.

The operator may move the pipelayer through various expected positions of the operation and note the load capacity at each position. Alternatively, the LMS may be programmed to record the capacity at each position and simulate the operation once the actual load is known. The operator then may pick up the load and estimate whether the load will exceed the load capacity at any of the expected positions. If so, he may then re-configure the expected positions until the load may be safely handled. The LMS may also warn the operator of an impending two-block event (when the load block contacts the pulley block).

The LMS system may also log a history of the lifts performed by the pipelayer 100, and this data can be downloaded to a computer for later analysis. The LMS may include an external, boom-mounted light bar to provide a simple visual indicator of approximate load on hook. The light bar may include a color scheme of lights. For example, green lights mean the crane is under a light load, yellow indicates a heavier load, and a red signals a high load condition. The LMS may also monitor grade of the surface that the pipelayer is operating on and calculate and display the proper load value that corresponds to the grade. The LMS may communicate with an LMS of a second pipelayer 100 and indicate the load distribution between the two pipelayers for pipe laying operations performed in tandem. With this information, the operators may coordinate activities to ensure that an optimal load distribution is maintained.

Additionally, the LMS may include a fine swing system. The fine swing system may include one or more sensors for detecting an off-center load being hoisted by the load block 140 and/or the boom 120. The sensor may be in data communication with the LMS controller. The off-center load exerts a torque on the bearing which may jerk the main assembly 105a relative to the undercarriage 105b, thereby creating a hazardous situation. If the slew lock is engaged and the operator unknowingly releases the slew lock with an off-center load, a similar hazard may be created. The fine swing sensor allows the LMS controller to detect an off-center load and automatically rotate the main assembly to center the load in a controlled fashion. In doing so, the LMS may override the slew lock if the slew lock is engaged. Alternatively, the LMS may simply indicate to the operator that the load is off center and allow the operator to manually center the load.

The LMS may include a manual override feature for overriding individual or multiple features thereof. The log history may still record even if the LMS is overridden.

The undercarriage 150b may include a lower frame 160 attached to the bearing 155 and two track assemblies 175, each removably attached to the lower frame 160. Each of the track assemblies 175 includes a track frame and one or more rollers 180a,b, such as sprockets, operatively coupled to a track shoe or belt 185. The track shoe 185 extends around the track frame and is movable relative to the track frame. The rollers 180a, b are supported by the track frame so that the rollers may rotate relative to the track frame. One of the rollers 180a, b may be a drive sprocket and the other an idler roller. A rotor of an electric or hydraulic track motor (not shown) may be rotationally coupled to the drive sprocket and a housing of the track motor may be attached to the track frame. A conduit, such as an electrical cable or hydraulic hose, may extend from the main frame 105 to the track motor. The conduit may be connected to the track motor by a quick-connect fitting. Operation of the track motor will cause movement of the track shoe 185 relative to the track frame.

Figure 2A:
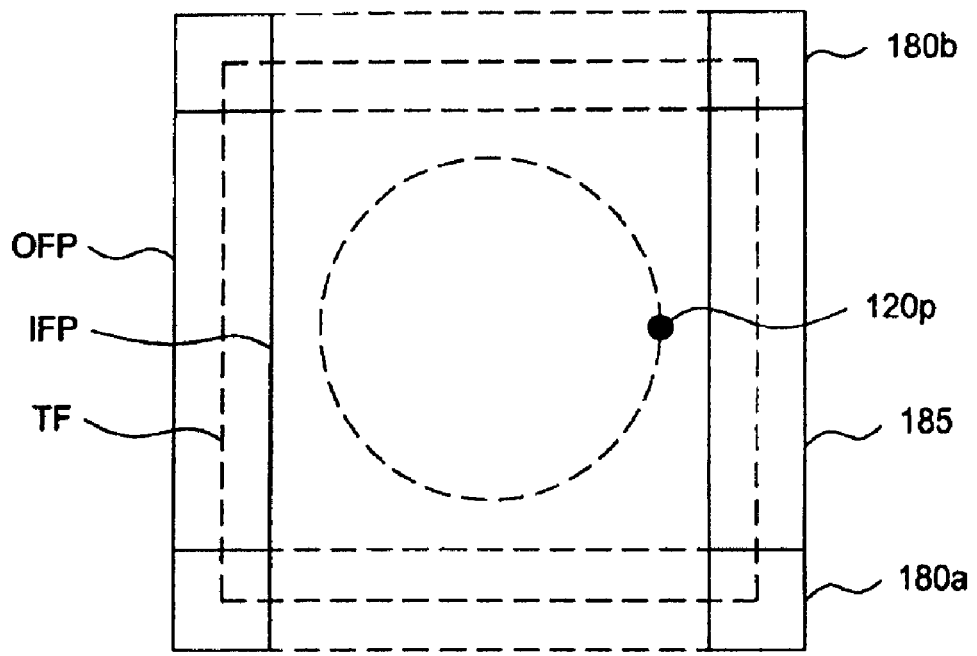
FIG. 2A is a schematic illustrating a configuration of the pipelayer so that the boom pivot is within both a rectangular footprint and a rectangular tipping fulcrum of the pipelayer, in accordance with some embodiments of the present invention.

FIG. 2A is a schematic illustrating configuration of the pipelayer 100 so that the boom pivot 120p is within a rectangular outer footprint OFP, a rectangular tipping fulcrum TF, and a rectangular inner footprint IFP of the pipelayer 100. The outer footprint OFP is defined by outer sides of the track shoes 185. The tipping fulcrum TF is defined by longitudinal centerlines of each of the track shoes 185 and by longitudinal centerlines of the rollers 180a, b. The inner footprint IFP is defined by inner sides of the track shoes 185. Since the boom pivot 120p is within the footprints OFP, IFP and the tipping fulcrum TF in the perpendicular and parallel, then it is also within the footprints and tipping fulcrum for any rotational position of the main frame relative to the undercarriage (represented by the dashed circle). Alternatively, the boom pivot 120p may be disposed between the outer footprint OFP and the tipping fulcrum TF or the inner footprint IFP and the tipping fulcrum TF.

Figure 3:
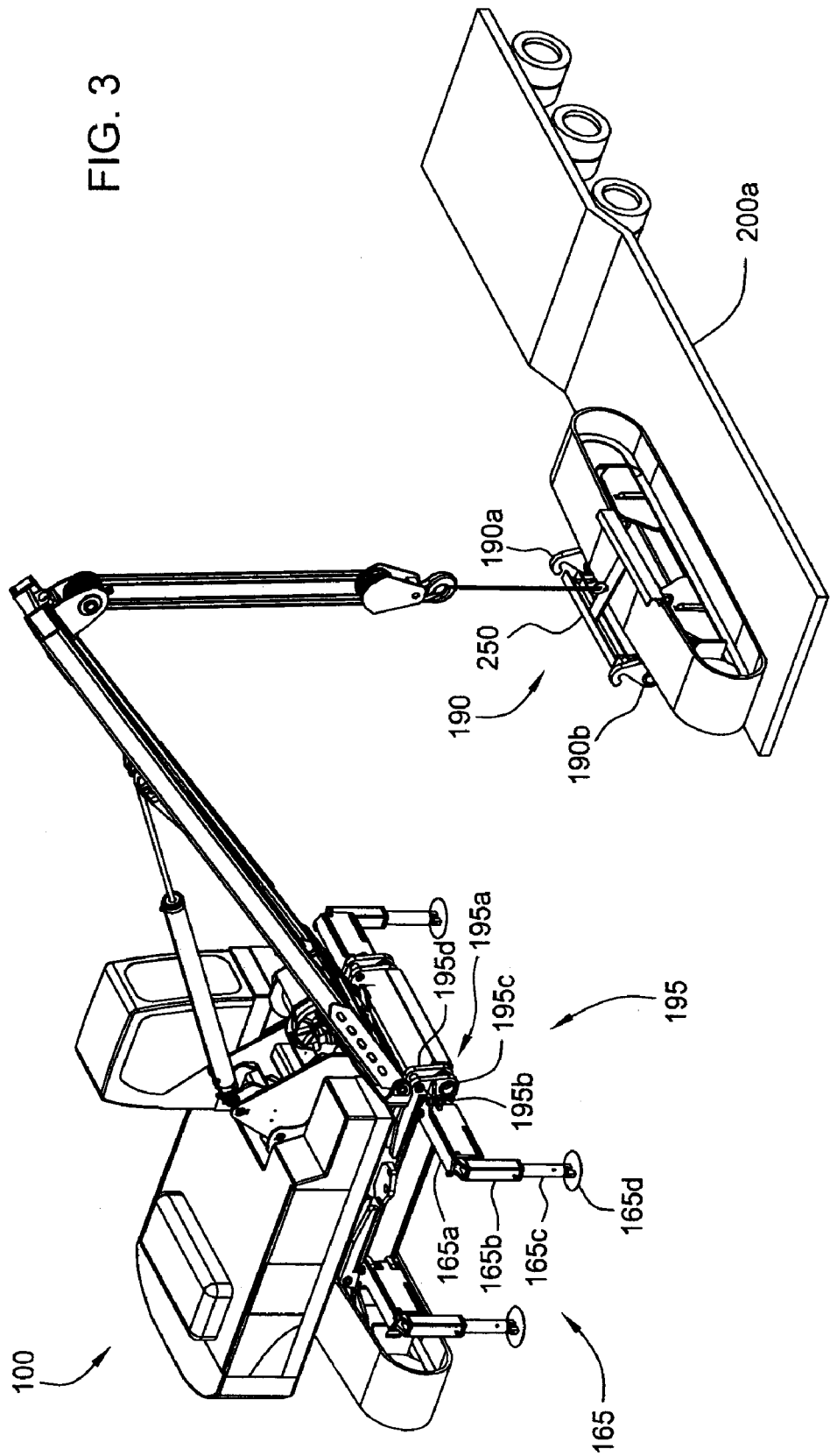
FIG. 3 illustrates a method of loading the pipelayer for transportation, according to another embodiment of the present invention.

FIG. 3 illustrates an act of a method for partially disassembling the pipelayer 100 and loading the pipelayer on two or more tractor-trailers 200a (only one trailer shown and gooseneck removed for simplicity) for transporting the pipelayer 100 between work sites over public roads, according to another embodiment of the present invention. The trailers 200a may be standard lowboy flatbed trailers. FIG. 3 illustrates outriggers 165 in the extended position and one of the track assemblies 175 loaded on a first trailer 200a.

To facilitate disassembly of the pipelayer 100 for transport and reassembly of the pipelayer 100 for delivery to the next job site, each of the track assemblies 175 may include one or more lugs 190 attached to the track frame. Each of the lugs 190 may include a hook 190a and a hole 190b. Each of the lugs 190 is received in an opening 195a of a bracket assembly 195 of the lower frame 160. The bracket assembly 195 may include two plates 195d spaced apart to define the opening 195a, each plate 195d attached to the lower frame 160. Fasteners 195b, c (i.e., a bolt or a pin) may each be disposed through corresponding holes in the plates 195d. To attach each track assembly 175 to the lower frame 160, the fastener 195c is removed and the hook 190a is engaged with the fastener 195b and the fastener 195c is then inserted through holes in the plates 195d and the hole 190b and then locked to the track frame (i.e. by a nut or a clip). The track conduit 110 may then be connected to the track motor by the quick-connect fitting. Alternatively, the lug 190 may be attached to the lower frame 160 and the bracket assembly 195 may be attached to the track frame. Alternatively, each of the track assemblies 175 may be conventionally attached to the lower frame 160.

To further facilitate disassembly for transport and reassembly for delivery of the pipelayer 100, the undercarriage 150b may include one or more outriggers 165 selectively pivotal relative to the lower frame 160. Each outrigger 165 may include a first arm 165a, a second arm 165b, a third arm 165c, and a pad 165d. The first arm 165a is selectively pivotal relative to the lower frame 160. The second arm 165b is selectively pivotal relative to the first arm and is retractable within the first arm 165a. The third arm 165c is selectively longitudinally coupled to the second arm 165b and is retractable within the third arm 165c. The pad 165d is pivoted to the third arm 165c. The outriggers 165 are operable between an extended position and a retracted position.

Starting from a retracted position (FIG. 2), the first arm 165a is pivoted from a retracted position against a side of the lower frame 160 to an extended position about perpendicular to the side of the lower frame 160. The first arm 165a may then be locked into position. The second arm 165b is then extended from within the first arm 165a. The second arm 165b may begin to pivot downward as it is being extended or may be locked into a position parallel to the first arm. When the second arm 165b is fully extended it either pivots to a perpendicular position relative to the first arm 165a or unlocked so that it may pivot to such a position. The second arm 165b is then locked into the perpendicular position. The third arm 165c and the pad 165d may then be extended from within the second arm 165b. As the third arm 165c extends, the pad 165d will contact the ground and begin to lift the pipelayer off of the track shoes 185. The arms 165 may be coordinated so that all of the arms operate simultaneously. Once the third arm 165c is fully extended, the third arm 165c may be locked into position. The outrigger 165 is then fully actuated.

The track assemblies 175 may then be removed. To operate the outrigger 165 to the retraced position the above recited process is reversed. Operation of the outrigger 165 may be fully automated and controlled from the cab and/or wirelessly by a remote control (not shown) so that the operator may view operation of the outrigger 165 from the ground. Automation of the outrigger 165 operation may be accomplished by the provision of a hydraulic or electric motor or piston (not shown) to pivot the first arm 165a and hydraulic or electric lines (not shown) to actuate the second 165b and third 165c arms and the locking mechanisms.

The outriggers 165 are operated to lift the pipelayer 100 off of the track shoes 185. The fasteners 195c are removed. The boom 120 and the load block 140 are used to lift the track assembly 175 from the lower frame 160. To accomplish this, the boom 120 may be raised to a substantially vertical position and the load block 140 may be lowered to the track assembly 175 that is being removed. The track assembly 175 may be prepared for loading by attaching a clamp 250 that grasps edges of the track assembly 175 and has a lifting lug for connection to the load block 140. Alternatively, chains with hooks (not shown) could be used instead of the clamp 250. The load block 140 may be raised to lift the track assembly 175 from the lower frame 160. The boom 120 may then be lowered to move the track assembly 175 over the trailer. The load block 140 may then be lowered to set the track assembly 175 onto the trailer 200a. Removal of the second track assembly 175 is similar to that of the first track assembly 175 with the addition that the main assembly 150a may be rotated so that the cab 115 faces the second track assembly 175 and then rotated back after the second track assembly 175 is secured so that the second track assembly 175 may be placed on the trailer 200a. Alternatively, the trailer 200a may instead be moved adjacent to the second track assembly 175.

After the track assemblies 175 have been removed and loaded on the first trailer 200a, the second trailer is aligned for backing up underneath the remaining pipelayer 100. The second trailer is positioned so that a longitudinal axis of the trailer is perpendicular to the longitudinal axis Luc of the undercarriage 150b. This is because the length of the lower frame 160 may be equal to or less than or substantially equal to or less than a width of the second trailer whereas the width of the lower frame 160 may be greater or substantially greater than the width of the second trailer 200b. The main assembly 150a may be oriented so that the cab 115 faces the second trailer so that the operator may view the second trailer backing up. Alternatively, the main assembly 150a may be oriented so that the cab 115 faces away from the second trailer and the operator may exit the cab 115 and view the backing up of the trailer from the ground.

Backing up of the second trailer then commences. The outriggers 165 provide sufficient clearance for axles of the second trailer to pass underneath the remaining pipelayer 100. Before finishing the backing up of the second trailer, the main assembly 150a may be rotated 180 degrees (or may already be in that position) so that the truck operator may place the counterweight 145 or second side 105b of the main frame 105 in substantial vertical alignment with a front end of the second trailer (the end proximate the tractor).

Once the remaining pipelayer 100 is aligned with the front end of the second trailer, the outriggers 165 are retraced until the lower frame 160 rests on the second trailer. The outriggers 165 may then be fully actuated to the retracted position for transport. The boom 120 may then be lowered to a horizontal or nearly horizontal position. The boom 120 may hang over a rear end of the second trailer. A stinger or flip trailer (not shown) may be hitched to the rear end of the second trailer to contain the overhang (depending on the length of the overhang and the local transportation laws). Alternatively, a shorter boom may be used so that there is no overhang. The pipelayer 100 may then be transported to another worksite using the two tractor-trailers 200a.

Alternatively, the counterweight 145 and the boom 120 may then be removed and transported on a third trailer (not shown). Alternatively, the counterweight 145 and the boom 120 may be removed prior to loading the remaining pipelayer 100 onto the second trailer. The stinger trailer would not be used for the second trailer. The boom 120 is loaded with the winch 130 facing the third trailer and supporting the first end of the boom 120. Alternatively, the boom 120 may be loaded with the winch 130 facing away from the third trailer and a block (not shown) may be used to support the first end of the boom 120.

The PCA 125 may be left on the remaining pipelayer 100, may be removed with the boom 120, or may be removed from both the boom 120 and the remaining pipelayer 100. If the PCA 125 is left on the remaining pipelayer 100, a free end may be supported by a bracket (not shown). If the PCA 125 is removed from both the boom 120 and the remaining pipelayer 100, then it may be transported on either the second or the third trailer. Alternatively, if the adaptor 110 is used, the adaptor 110 and the boom 120 together (disposing of the need to disassemble the PCA 125) may be loaded on the third trailer (with the counterweight 145) or the boom 120 may be separated from the adapter 110 and loaded. Alternatively, only one of the boom 120 and the counterweight 145 may be removed from the remaining pipelayer 100 and loaded on the third trailer.

Figure 4:
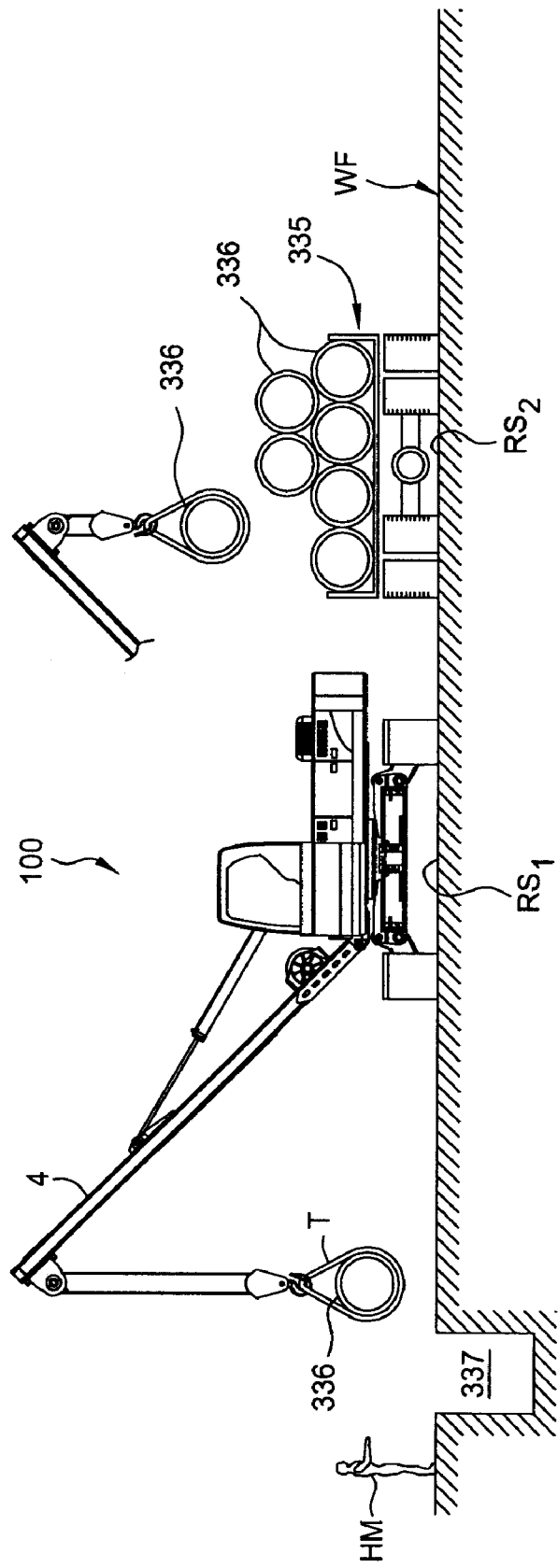
FIG. 4 illustrates a pipelaying operation, according to another embodiment of the present invention.

FIG. 4 illustrates a pipelaying operation using one or more pipelayers 100, according to anther embodiment of the present invention. FIG. 4 illustrates a short pipe transporting act of the pipelaying operation. Alternative or additional acts of the pipelaying operation that may be performed include a short pipe centering/joining act, a long pipe centering/joining act, and a centering/joining act performed on a grade.

In the pipelaying operation, the following acts may be repeated: (a) short pipe transporting: short pipes 336 stacked on a material handling vehicle 335 are moved to a place near a trench 337 and arranged in a line; (b) short pipe centering/joining: an adequate number of short pipes 336, which have been aligned in the place near the trench 337 by the short pipe transporting act, are joined by welding into a long pipe (not shown); and (c) long pipe centering/joining act: the long pipe (not shown) prepared by the short pipe centering/joining act is joined by welding to the pipeline (not shown) under construction.

A working field WF is formed in the short pipe transporting operation on the right of the trench 337, which has been dug. In the working field WF, a traveling space $RS_1$ for the pipelayer 100 and a traveling space $RS_2$ for the material handling vehicle 335 are arranged in this order from the side of the dug trench 337, so that the pipelayer 100 and the material handling vehicle 335 can travel together in an operating direction parallel with the dug trench 337. After the self-propulsion of the undercarriage 150b allows the pipelayer 100 to move the distance corresponding to the planned pitch of alignment of the short pipes 336 in the operating direction, the main assembly 150a turns about to take one of the short pipes 336 out of the material handling vehicle 335 and place it near the dug trench 337. Each of the short pipes 336 are prepared for laying by wrapping a sling T therearound. By repeating this operation, some or all the short pipes 336 stacked on the material handling vehicle 335 are moved to and aligned in the place near the dug trench 337.

In the short pipe centering/joining act, the short pipes 336 aligned in the place near the dug trench 337 are raised to a level suited for welding operation and the are centered to make longitudinal axes of adjacent short pipes coincident with each other. Centering of the short pipes 336 is performed by cooperation of a plurality of pipelayers 100 based on an instruction from the hoist-man.

In the long pipe centering/joining act, an end of the long pipe and an end of the pipeline under construction are raised to a level suited for welding operation and centered to make longitudinal axes of the ends coincident with each other. Centering of the ends is also performed by cooperation of a plurality of pipelayers 100 based on an instruction from the hoist-man.

If either of the centering/joining acts is carried out on a grade, the pivoted pulley block 135 compensates for the grade, thereby maintaining a portion of the cable 132 and the load block 140 aligned with a direction of gravity.

FIG. 5 is an orthogonal view of a pipelayer 400, according to an another embodiment of the present invention. A second winch 430 is used instead of the PCA 125 to hoist the boom 120. The second winch 430 is attached to the adaptor 110 or directly to the main frame 105 and includes a second drum having a second cable 432 wrapped therearound. The second drum is rotatable relative to a second housing of the second winch 430. The second drum may be driven by a hydraulic or electric motor (not shown). Pivoted to the second longitudinal end of the boom 120 is a first sheave block 435a. A second sheave block 435b is pivoted to the second winch housing, the adaptor 110, or directly to the main frame 105. Each of the sheave blocks 435a, b includes a plurality of pulleys or sheaves. The cable 132 extends from the second drum and around the sheaves of the sheave blocks 435a, b in order to achieve a mechanical advantage. Unwinding of the cable 432 from the second winch drum lowers the boom 120 and winding of the cable 432 around the second winch drum raises the boom 120. Loading of the pipelayer 400 is similar to loading of the pipelayer 100. If the third trailer 200c is used, the first sheave block 435a may simply be removed and loaded on the second trailer 200b with the remaining pipelayer 400 (may depend on whether the adaptor 110 is used, see above). Usage and loading of the pipelayer 400 is similar to usage and loading of the pipelayer 100.

Figure 6D:
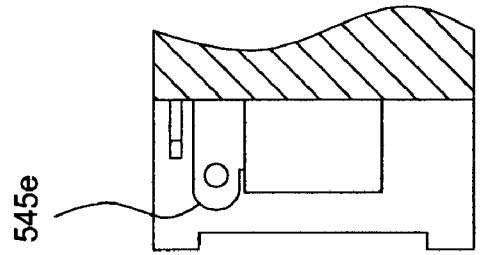
Figure 6C:
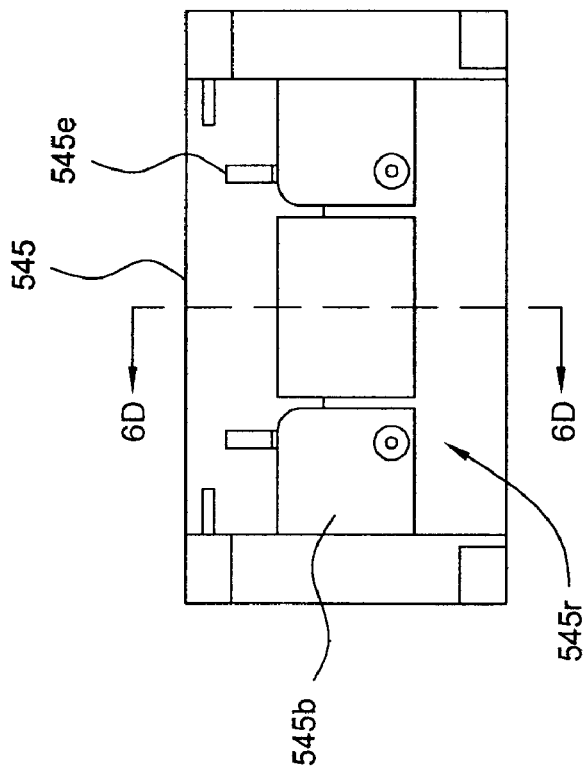

FIGS. 6A-C illustrate a removable counterweight system (RCW) 500, according to another embodiment of the present invention. FIG. 6A is a side view of the RCW 500 in a first position where a counterweight 545 is removably attached to the main frame 105 (at second side 105b). FIG. 6B is a side view of the RCW 500 in a second position where the counterweight 545 is removed from the main frame 105 and set on the ground. The counterweight 545 is shown separately in FIGS. 6C-D for clarity. FIG. 6C is a front view of the counterweight 545. FIG. 6D is a section view of FIG. 6C taken along line 6D-6D.

The RCW 500 may be installed on the pipelayers 100, 400, 700 in lieu of the counterweight 145. The RCW 500 may be hydraulically operated between the first and second positions. The RCW 500 may be operated from the cab 115 and/or from controls (not shown) located on the main frame 105. The RCW 500 allows for quick, automated, and independent removal of the counterweight 545 in instances where the pipelayer 100 (or 400) will be operated on steep grades. During steep grade operation, the counterweight 145/545 destabilizes the pipelayer 100 in certain rotational orientations of the main assembly 150a relative to the undercarriage 150b and/or loading scenarios. Removal of the counterweight 545 allows more versatile operation of the pipelayer 100 on steep grades. Alternatively or in addition thereto, the weight of the lower frame 160 may be increased by adding weights (not shown) or increasing the thickness of structural members to compensate for removal of the counterweight 545 and/or increase stability of the pipelayer 100 on steep grades. Alternatively or in addition to using the RCW for steep grade operation, the RCW 500 may be used to load the counterweight 545 on the third trailer 200c (discussed above). Alternatively, the pipelayer 100 may be operated on steep grades without the RCW 500 by relying on the LMS to safely constrain movement of the pipelayer 100 from unstable positions.

The RCW 500 may include a piston and cylinder assembly (PCA) 505, a base 510, a head 520, one or more front arms 525a, one or more rear arms 525b, and the counterweight 545. The base 510 is attached to the main frame 105 via lugs. One or more blocks (not shown for clarity) may be attached to the main frame 105 proximate to the base 510. The PCA 505 is pivoted to the main frame 105 via a lug and pivoted to the head 520. The front arms 525a are pivoted to the main frame 105 via lugs and pivoted to the head 520. The rear arms 525b are pivoted to the main frame 105 via lugs and pivoted to the head 520. One or more forks 515 are also pivoted to the head 520. The forks 515 allow the counterweight 545 to be pivoted to the head 520 by receiving respective eyes 545e attached to the counterweight 545. Once holes through the forks are aligned with respective holes through the eyes 545e, pins (not shown) are inserted through each fork and eye, thereby securing the counterweight 545 to the head 520. The forks may 515 also be free to rotate about their longitudinal axis.

The counterweight 545 includes a body having a recess 545r formed therein, one or more blocks 545b attached thereto and disposed in the recess 545r, and the eyes 545e attached thereto and disposed in the recess. The eyes 545e may be attached to the body via the blocks 545b. When the counterweight 545 is in the first position, the PCA 505, the base 510, the arms 525a, b, and the forks 515 may be disposed in the recess 545r. The head 520 may extend upward out of the recess 545r or be disposed in the recess 545r as well.

Starting from the first position where the PCA 505 is fully extended, retraction of the PCA 505 articulates the head 520 (and the counterweight 545) horizontally away from the main frame 105 and vertically downward until the counterweight 545 is seated on the ground. The front 525a and rear 525b arms support the head 520 as it articulates between the first and second positions. Once the counterweight 545 is seated on the ground, the pins may be removed and the head 520 may be returned to the first position to stow it for pipelayer operation without the counterweight 545. To re-attach the counterweight 545, the process is reversed. The head 520 is articulated to the second position, the pins inserted, and the PCA extended. Extension of the PCA articulates the head 520 (and the counterweight 545) vertically upward and horizontally toward the main frame 105 until bottoms of the blocks 545b are seated on the base 510 and faces of the blocks 545b abut the base blocks. One or more safety latch mechanisms (not shown) may be actuated (manually or automatically) once the counterweight 545 is seated on the base 510. Further, a proximity sensor may be provided to verify that the counterweight has properly seated.

Figure 7B:
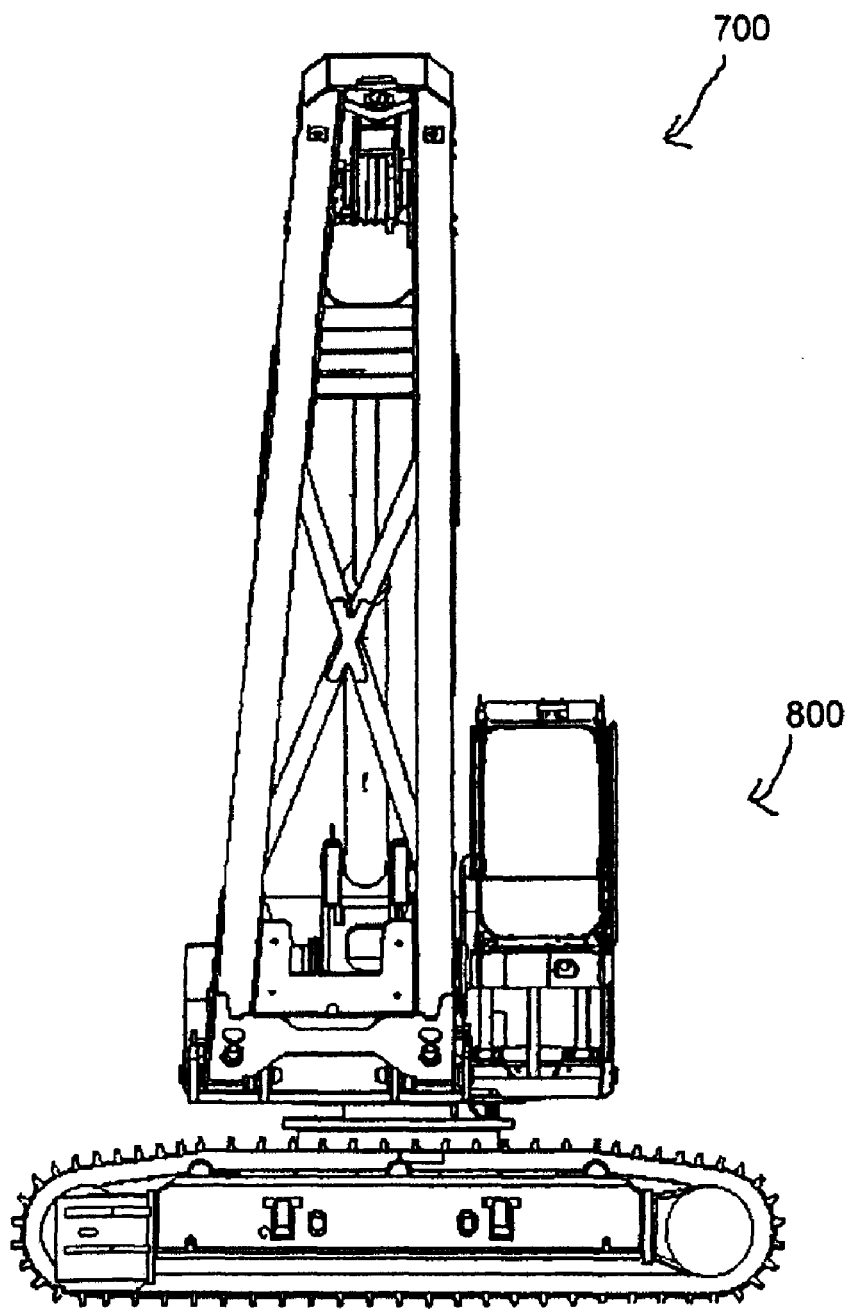
Figure 7C:
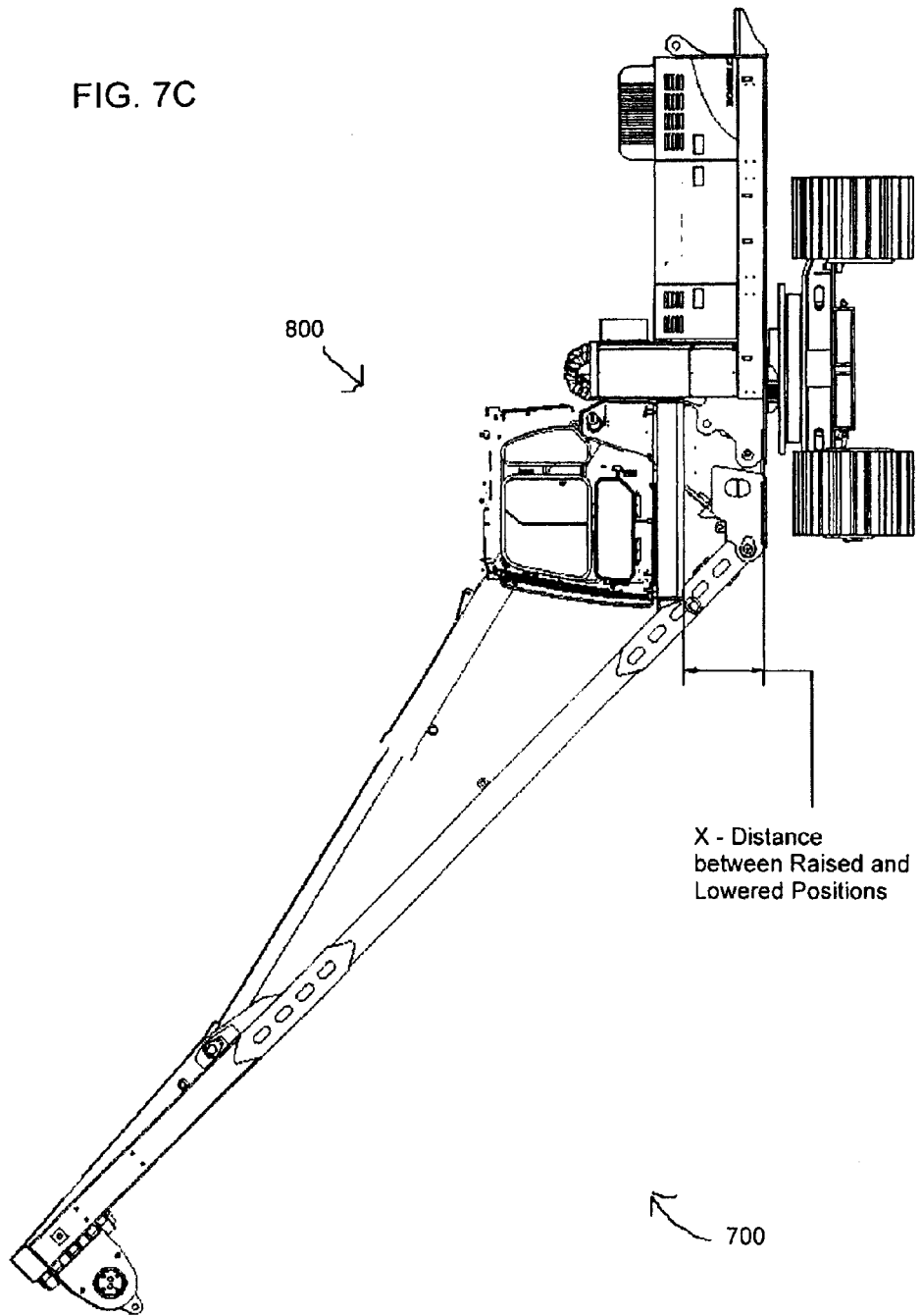
Figure 7D:
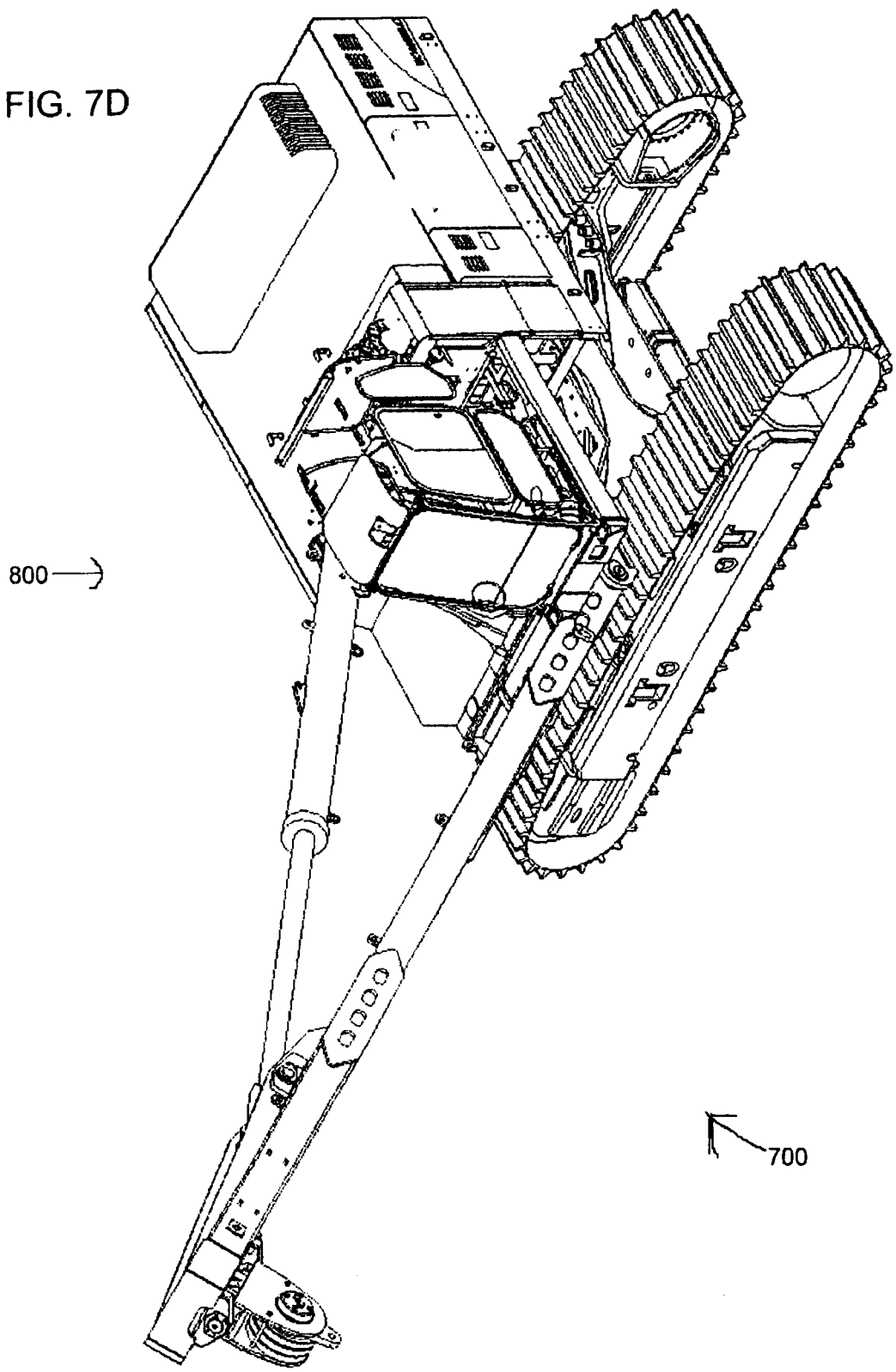

A pipelayer in accordance with some embodiments of the present invention may be equipped with a cab riser. The cab riser allows the position of the operator to change, in order for the operator to obtain a different, and preferably better, viewing position during various pipelaying operations. FIG. 7A is a view of a pipelayer 700 illustrating operation of a cab riser 800, according to another embodiment of the present invention. FIGS. 7B-7D are various views of the pipelayer 700 with the cab riser 800 in the raised position. Except for the cab riser 800 and where otherwise noted, the pipelayer 700 may be similar to the pipelayer 100. The cab riser 800 may be attached to the main frame 105 and operable to vertically move the cab 115 between a raised position and a lowered position. In this manner, the operator may adjust the height of the cab relative to the main frame to obtain optimum visibility. The cab riser 800 may raise the cab a maximum distance X (see FIG. 7C) from a bottom of the main frame, such as one to six feet, such as about two and one-half feet.

Figure 7E:
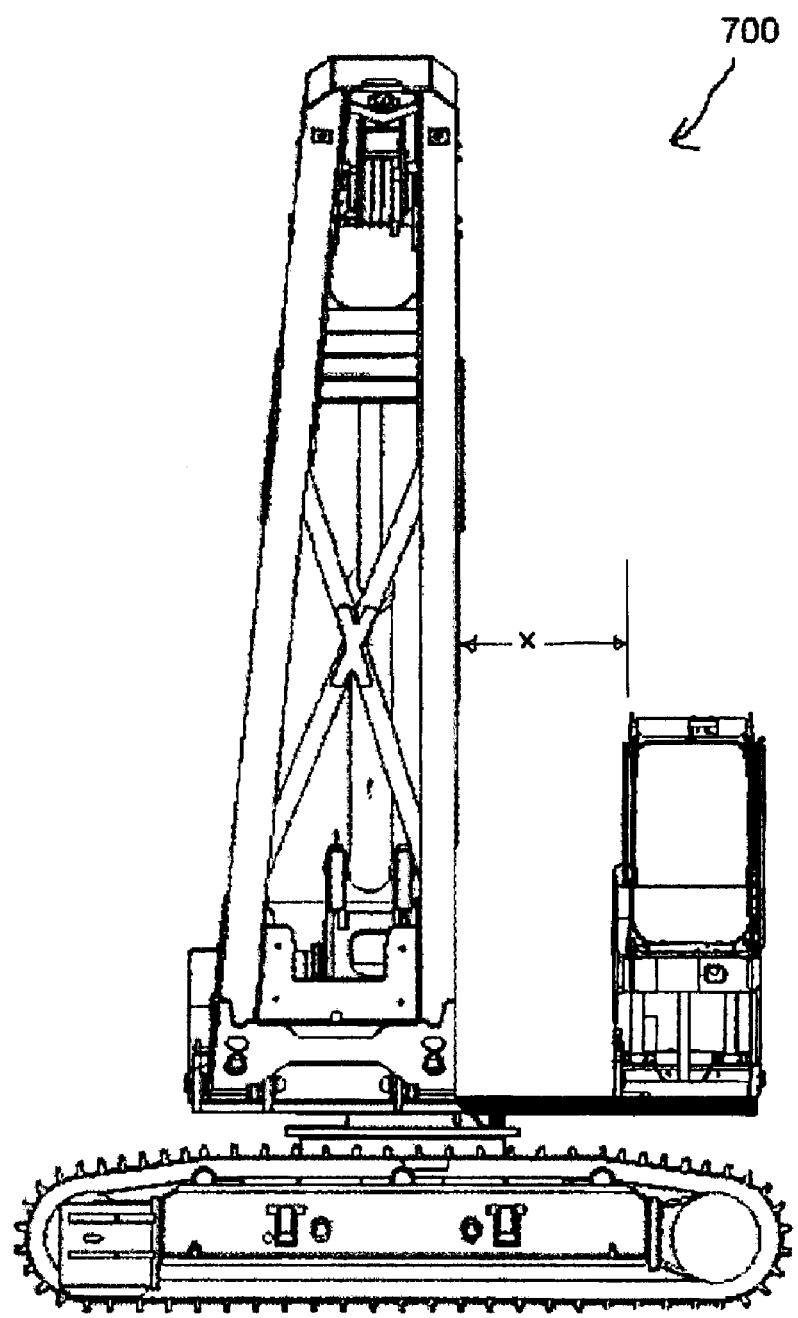
FIG. 7E shows the cab riser equipped to move horizontally, in accordance with some embodiments of the present invention.
Figure 7F:
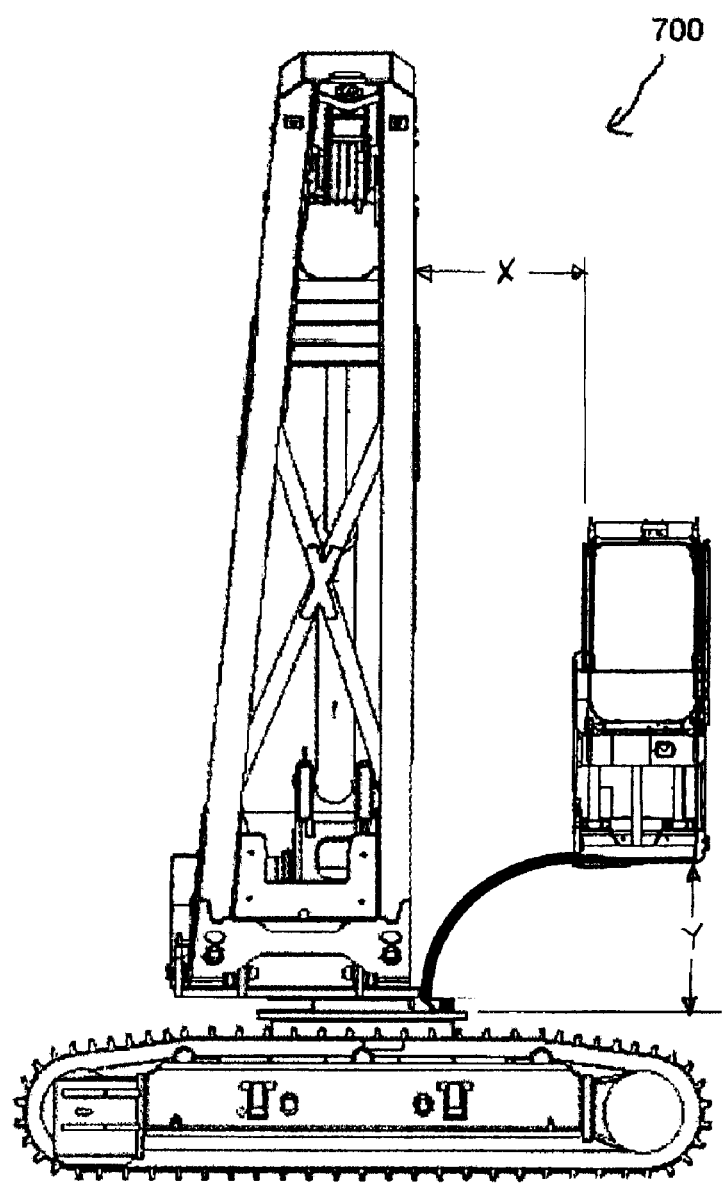
FIG. 7F shows the cab riser equipped to move in both a horizontal and a vertical direction, in accordance with some embodiments of the present invention.

The cab riser may allow vertical height adjustment of the cab, so that the operator may look down into a trench where pipe is being laid. Additionally, it is contemplated that the cab riser may allow additional movement of the operator cab (e.g., horizontal movement, angled or curved movement) so that the operator can position himself closer to or over a trench, or to otherwise attempt to obtain a more favorable viewing position, or to move the cab clear of an obstacle or the expected or possible path of travel of the pipe or other equipment. With reference to FIG. 7E, the cab riser may be equipped to move horizontally, in an X direction, so that the operator may look directly into the trench. With reference to FIG. 7F, the cab riser may be equipped to move on a channel in an angled or curved direction so that the cab moves in both a horizontal and a vertical direction, e.g., an X and a Y direction. Of course, it will be apparent from this disclosure that the cab also could be mounted on a track or linkage that allows movement forward, or forward and upward, towards the trench.

Figure 8A:
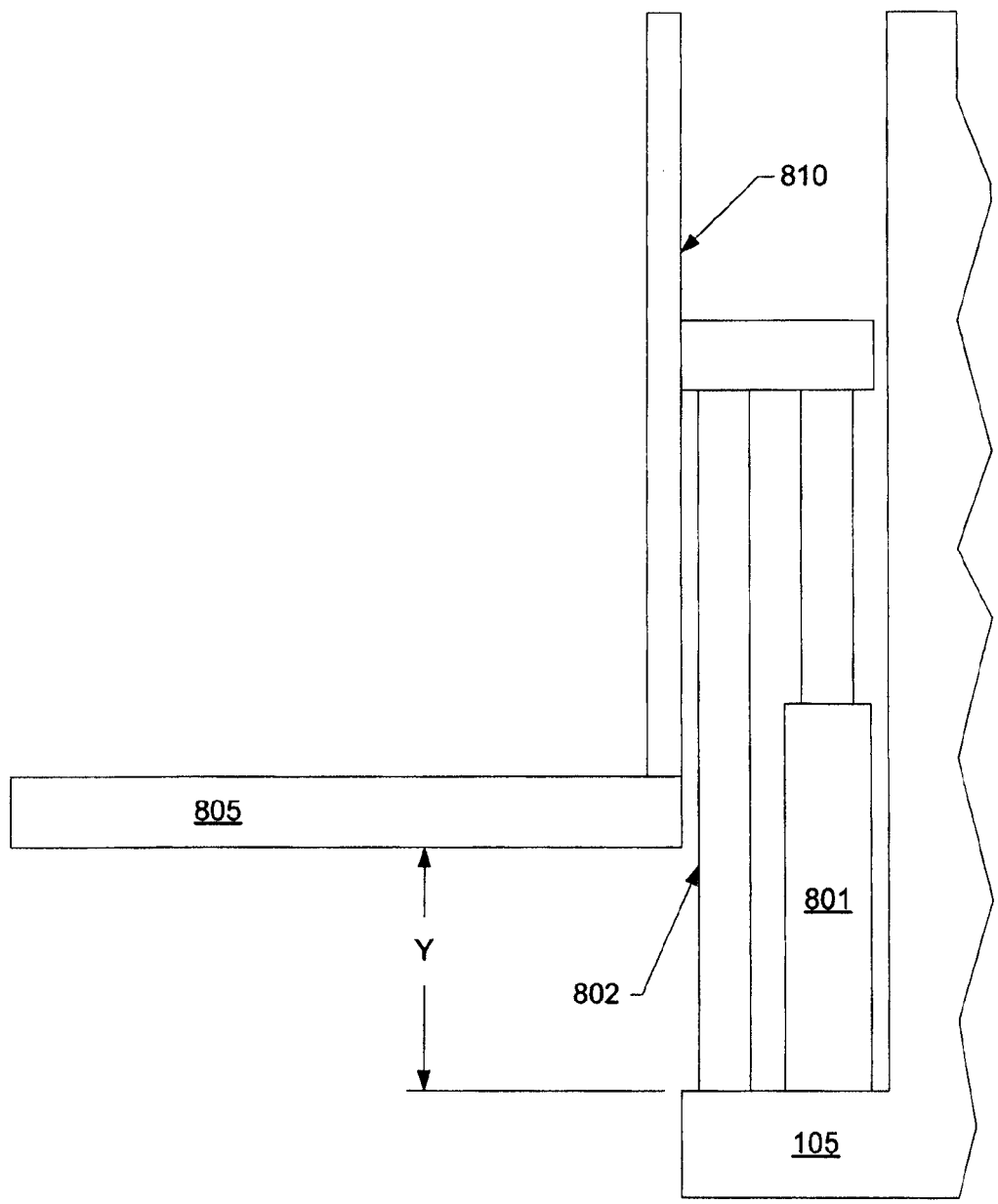
FIG. 8A is a view of the cab riser, in accordance with some embodiments of the present invention.
Figure 8B:
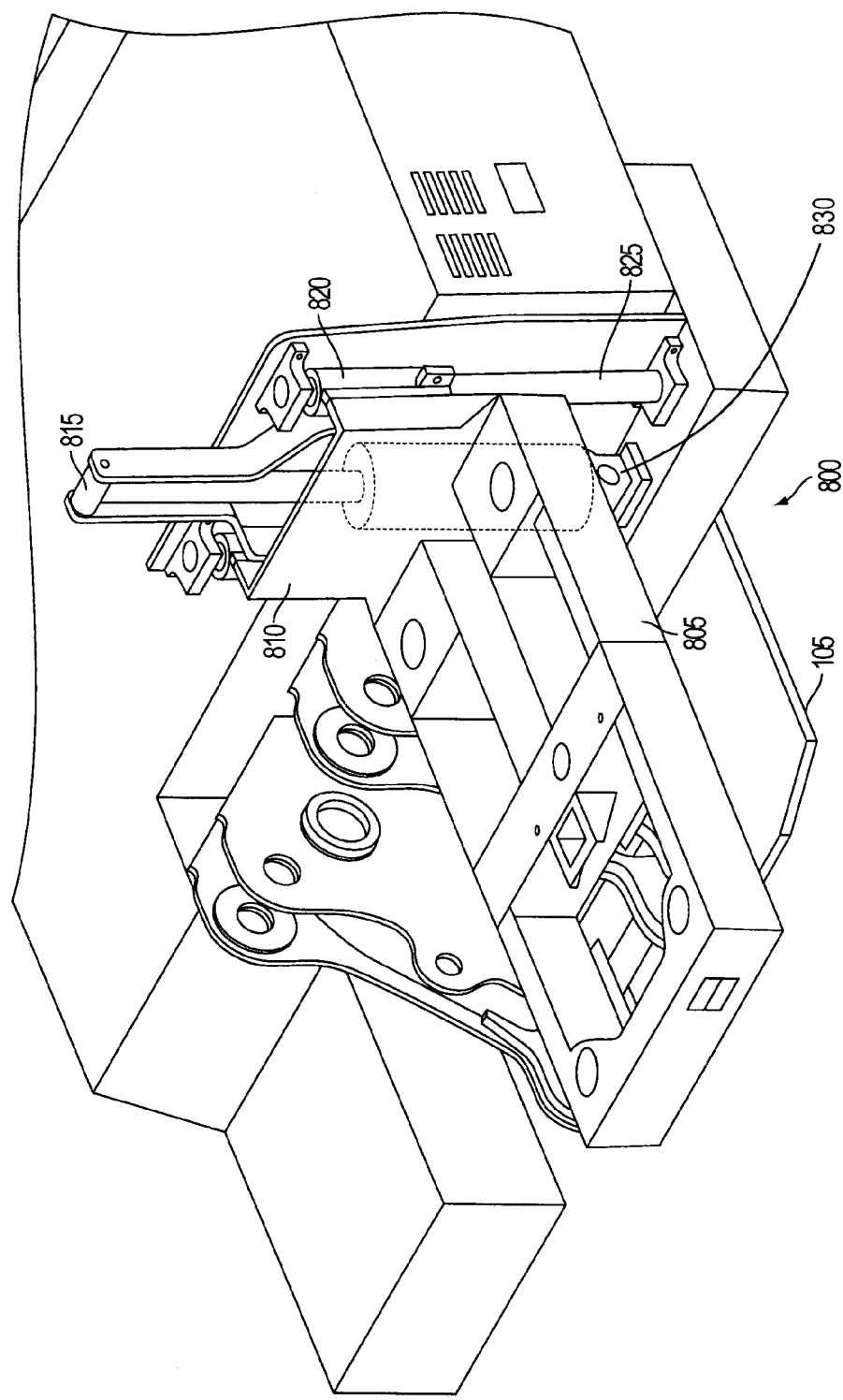
FIG. 8B is a detailed view of the cab riser, in accordance with some embodiments of the present invention.
Figure 8C:
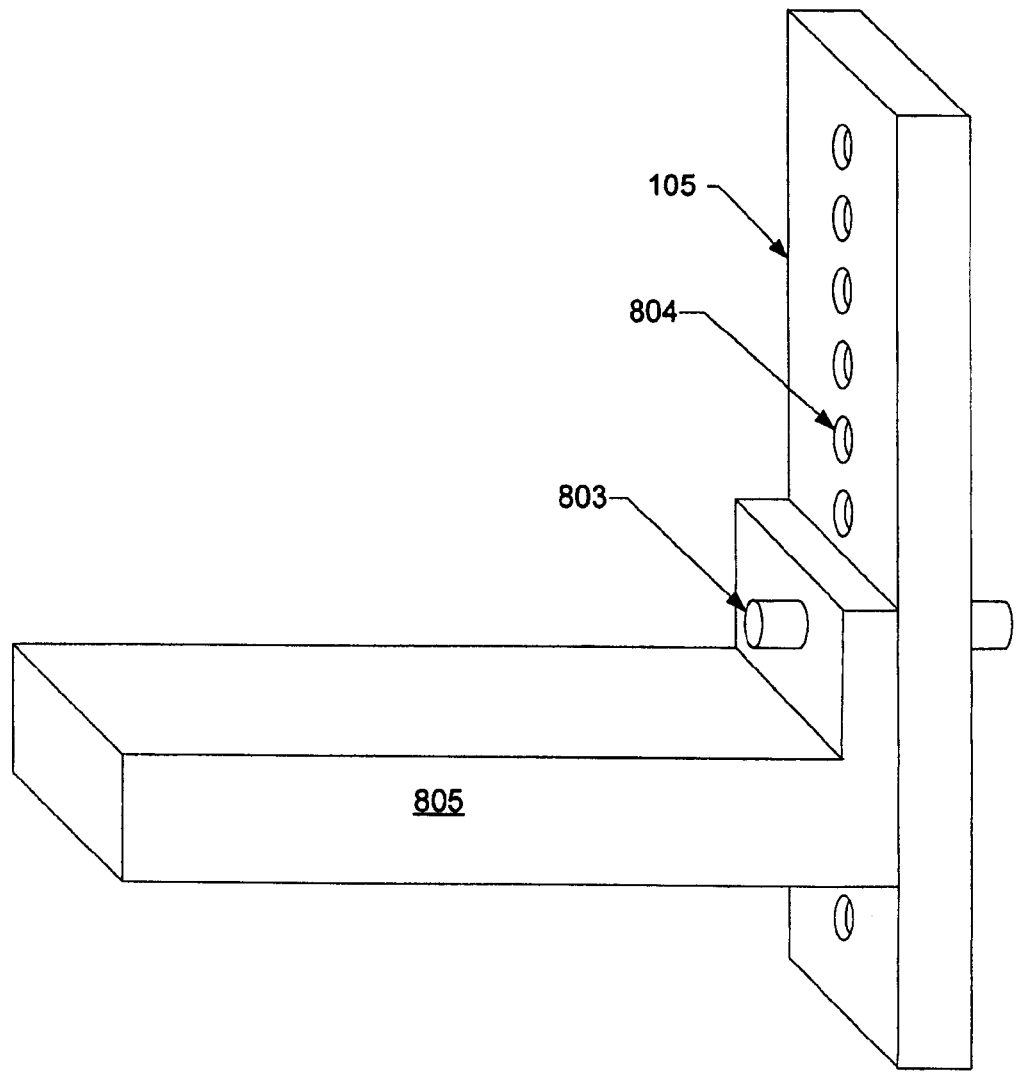
FIG. 8C is a depiction of a locking mechanism in accordance with some embodiments of the present invention.

FIG. 8A is a side view of a cab riser, in accordance with some embodiments of the present invention. FIG. 8B is a detailed view of the cab riser 800. FIG. 8C is a view of a locking device that may be used with the cab riser in accordance with some embodiments of the present invention.

With reference to FIG. 8A, the cab riser 800 may include a base 805, a frame 810, a lifting mechanism 801, and an alignment mechanism 802. The lifting mechanism 801 pushes the base 805 upwards a distance noted as "Y." As non-limiting examples, the riser base 805 may be integrally formed as part of the operator cab, may be a separate element that the operator cab is attached to, or may be any suitable connection between the operator cab and the riser frame 810. In this manner, it is contemplated that the riser base 805 may be modular so that the cab riser and operator cab may be swapped out of the pipelayer when not needed or during various other excavation activities.

With reference to FIG. 8B, the lifting mechanism 801 may be a piston and cylinder assembly (PCA) 815 that may be longitudinally coupled to the frame 810, and may raise or lower the riser frame 810 relative to the vehicle frame 105 via injection or removal of hydraulic fluid. The cylinder of the PCA 815 may be longitudinally coupled to the main frame 105 at attachment point 830. The cylinder of the PCA 815 may be attached to the main frame via a pivoting connection, enabling movement of the PCA 815 to prevent misalignment of the piston in the cylinder. The piston of the PCA 815 may be attached to the riser frame 810. The PCA 815 may be in fluid communication with the hydraulic system of the pipelayer 700 via a hydraulic conduit, such as a hose. When hydraulic fluid is introduced into the cylinder of the PCA 815, the hydraulic fluid may cause the piston of the PCA 815 to slide out of the cylinder, thereby raising the riser frame 810 and the cab riser. When hydraulic fluid is released from the cylinder of the PCA 815, the piston of the PCA 815 may slide back into the cylinder, thereby lowering the riser frame 810 and the cab riser.

Alternatively, the lifting mechanism 801 may be an electric motor may be used to raise or lower the base 805 instead of the PCA 815. An electric motor may use, for example, a screw jack or cables to raise or lower the base relative to the main frame.

With reference to FIG. 8C, the cab riser may also include an independently operable lock to retain the base 805 at a selected height. The lock may take the form of a pin 803 that slides from the cab riser into a hold 804 in the vehicle frame to lock the riser at the selected height. Alternatively, the lock may be a cam device attached to the cab riser that rotates when the selected height is attained to prevent movement of the cab riser.

The alignment mechanism 802 maintains proper alignment of the cab riser during various height adjustments. The alignment mechanism 802 may take any form, including, for example, with reference to FIG. 8B one or more guide sleeves 820, and one or more guide posts 825. The one or more guide sleeves 820 are attached to the frame 810. Each of the guide sleeves 820 is laterally coupled to a respective guide post 825 and free to vertically slide along the respective guide post 825. Each guide post 825 is attached to the main frame 105. Although shown with the pipelayer 700, the riser cab 800 may be equipped on the pipelayer 100 and/or the pipelayer 400.

Alternatively, the alignment mechanism 802 may be integral with the cab riser lift mechanism. For example, a lift linkage similar to that discussed above with regard to the removable counterweight may be used to lift the cab riser while maintaining proper alignment. While the shown embodiments show the cab being rotationally fixed with respect to the vehicle, it may also be equipped with a bearing or other features that allow it to rotate or swivel. For example, the cab may be modified such that it tilts forward as it rises (either as part of the lifting mechanism or via an independent control), or such that it can swivel left and right.

Figure 9:
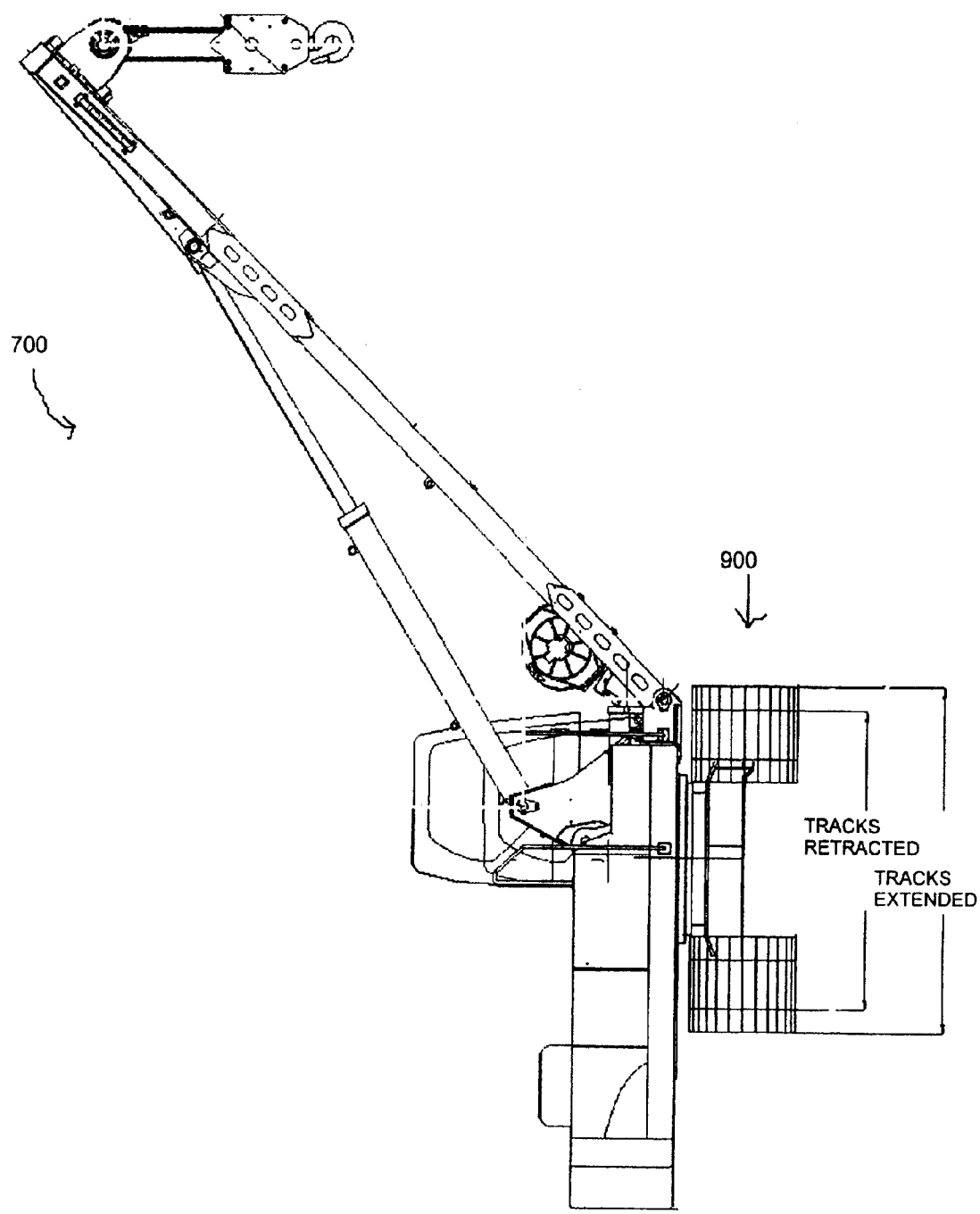
FIG. 9 is a view of the pipelayer illustrating operation of a variable track system, in accordance with some embodiments of the present invention.

FIG. 9 is a view of the pipelayer 700 illustrating operation of a variable track system 900. The pipelayer 700 includes the variable track system 900 instead of the outriggers 165 and the removable track system 190,195. The variable track system 900 is operable to extend each of the track assemblies 175 away from the lower frame 160 to an extended position or retract each of the track assemblies toward the lower frame to a retracted position. In the extended position, the boom pivot 120$p$ is within the outer footprint OFP, thereby increasing the load capacity of the pipelayer 700. In the retracted position, the pipelayer 700 fits on the trailer 200$a$ for transportation without requiring any disassembly thereof. The variable track system 900 may include one or more PCAs longitudinally coupled to the lower frame 160 and each of the track assemblies 175. The variable track system 900 may also include guides for transferring weight between the lower frame and the track assemblies. The variable track system may also include an independently operable lock for retaining the track assemblies in a selected position. The variable track system 900 may provide individual control of each track assembly and/or operate both tracks in tandem. Individual control may be useful when one of the track assemblies is proximate to an unstable trench. Alternatively, the variable track system 900 may be operated by an electric motor. Alternatively, the variable track system may be omitted, especially if the pipelayer is a lighter capacity model which may only need a footprint that would fit on the trailer 200*a* and be sufficient to hoist a lighter rated load.

Figure 10:
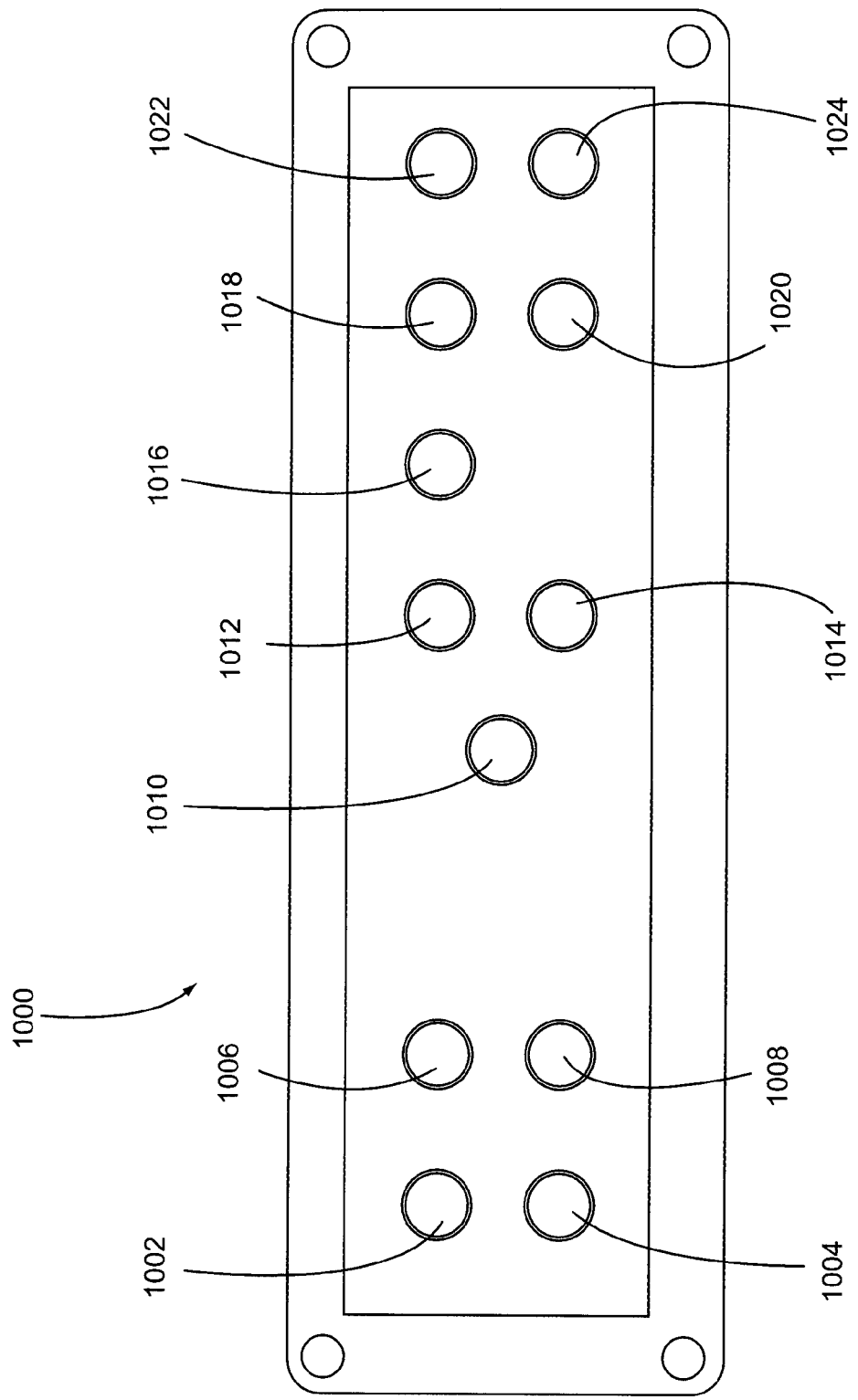
FIG. 10 is a drawing of a cab controller, according to another embodiment of the present invention.

FIG. 10 is a drawing of a cab controller 1000, according to another embodiment of the present invention. The cab controller may be located inside of the cab 115 and provide control, such as pushbutton, of various features of the pipelayer 700. The cab controller may include buttons for slew lock 1002, slew unlock 1004, fine swing enable/disable 1006, an LMS override 1008, cab riser enable/disable 1010, cab riser raise 1012, cab raiser lower 1014, variable track enable/disable 1016, track extension (for each track assembly) 1018, 1020, and track retraction (for each track assembly) 1022, 1024. The buttons may also illuminate to show which button of a two-button selection is selected or for multifunction buttons, such as enable/disable buttons. The cab riser and variable track enable/disable buttons may engage and disengage the various locks, discussed above. Additionally, the pipelayers 100, 400 may include similar controllers 1000.

While the foregoing is directed to embodiments of the present invention, other and further embodiments of the invention may be devised without departing from the basic scope thereof, and the scope thereof is determined by the claims that follow.

I claim:

1. A pipelayer comprising:
    an undercarriage having at least two tracks, each track comprising:
        a track frame coupled to the undercarriage, and
        a track shoe supported by and movable around the track frame; and
    a main assembly supported by the undercarriage and rotatable relative thereto, the main assembly comprising:
        a main frame,
        a boom pivotally mounted to the main frame,
        an operator cab,
        a cab riser connecting the operator cab to the main frame, the cab riser operable to selectively raise and lower the operator cab relative to the main frame, the cab riser comprising:
            a riser base movably attached to the main frame;
            a lift mechanism adapted to selectively raise and lower the riser base;
            a guide mechanism for insuring proper alignment and travel of the riser base; and
            a height lock adapted to mechanically connect the riser base to the main frame at one or more selected positions, the height lock being operable to retain the riser base at the selected height independent of the operation of the lift mechanism.

2. The pipelayer of claim 1, wherein the lift mechanism comprises a riser hydraulic system.

3. The pipelayer of claim 2, wherein the pipelayer further comprises a pipelayer hydraulic system, and wherein the riser hydraulic system is in fluid communication with the pipelayer hydraulic system, and wherein the riser hydraulic system comprises:
    at least one cylinder having a bore therein; and
    at least one piston having a first end disposed in the bore of the at least one cylinder and a second end protruding from the bore, wherein the bore of the at least one cylinder is in hydraulic communication with the riser hydraulic system, such that hydraulic fluid may be introduced into the bore causing the at least one piston to slide out of the bore.

4. The pipelayer of claim 3, wherein the cylinder is attached to one of the main frame and the riser base, and the piston is attached to the other of the main frame and the riser base.

5. The pipelayer of claim 1, wherein the lift mechanism comprises an electric motor.

6. The pipelayer of claim 1, wherein the guide mechanism comprises:
    at least one guide sleeve; and
    at least one guide post, wherein the at least one guide sleeve is coupled to the at least one guide post such that the at least one guide sleeve is free to slide along the at least one guide post.

7. The pipelayer of claim 6, wherein the at least one guide sleeve comprises at least two guide sleeves, and the at least one guide post comprises at least two guide posts.

8. The pipelayer of claim 6, wherein the at least one guide sleeve is attached to the riser base, and wherein the at least one guide post is attached to the main frame.

9. The pipelayer of claim 1, wherein the riser base is formed separately from the operator cab, and the operator cab is attached to the riser base.

10. The pipelayer of claim 1, wherein the cab riser is further operable to selectively move the operator cab laterally with respect to the main frame.

11. A movable cab assembly for industrial vehicles, the movable cab riser assembly comprising:
    an operator cab;
    an adjustment mechanism adapted to connect the operator cab to an industrial vehicle frame, and selectively move the operator cab relative to the industrial vehicle frame to modify an operator's field of view; and
    a guide mechanism for insuring proper alignment and travel of the operator cab relative to the industrial vehicle frame;
    wherein the industrial vehicle frame comprises a pipelayer frame rotatably mounted on an undercarriage and having a pipelayer boom pivotally attached thereto;
    wherein the adjustment mechanism comprises a mechanism adapted to selectively move the operator cab in a horizontal direction relative to the industrial vehicle frame.

12. The movable cab assembly of claim 11, wherein the adjustment mechanism comprises at least one hydraulic piston.

13. The movable cab assembly of claim 11, wherein the guide mechanism comprises at least one guide post and at least one guide sleeve slidably connected to the at least one guide post.

14. The movable cab assembly of claim 11, wherein the adjustment mechanism comprises a lift mechanism adapted to selectively raise and lower the operator cab relative to the industrial vehicle frame.

15. The movable cab assembly of claim 11, wherein the adjustment mechanism further comprises a mechanism adapted to selectively move the operator cab in a vertical direction relative to the industrial vehicle frame.

16. A method of laying pipe using a pipelayer equipped with a cab riser for adjusting the height of an operator cab, the method comprising:
    lifting a pipe using a boom of the pipelayer;
    rotating the boom and the pipe relative to a pipelayer undercarriage;

adjusting a position of an operator cab relative to the pipelayer undercarriage to provide a different field of view into a trench into which the pipe is to be positioned; and lowering the pipe into the trench using the pipelayer;

wherein adjusting the position of the operator cab comprises:

moving the operator cab in a vertical direction with respect to the pipelayer undercarriage; and translating the operator cab in a horizontal direction with respect to the pipelayer undercarriage.

17. The method of claim 16, wherein adjusting the position of the operator cab comprises introducing a hydraulic fluid into a bore or a hydraulic cylinder to drive a piston to lift the operator cab.

18. The method of claim 16, wherein adjusting the position of the operator cab is performed before lifting the pipe.

19. The method of claim 16, wherein adjusting the position of the operator cab is performed before rotating the boom.

20. The method of claim 16, further comprising moving the undercarriage relative to the ground to a position adjacent the trench after lifting the pipe.

21. The method of claim 20, wherein adjusting the position of the operator cab is performed after moving the undercarriage.

* * * * *